(12) United States Patent
Khoo et al.

(10) Patent No.: US 12,493,025 B2
(45) Date of Patent: Dec. 9, 2025

(54) MICROFLUIDIC DEVICE AND METHOD OF PREPARING A CELL MODEL FOR DISEASE ASSOCIATED WITH CANCER

(71) Applicants: City University of Hong Kong, Hong Kong (CN); The Hong Kong Polytechnic University, Hong Kong (CN)

(72) Inventors: Bee Luan Khoo, Hong Kong (CN); Song Lin Chua, Hong Kong (CN); Yanlin Deng, Hong Kong (CN)

(73) Assignees: City University of Hong Kong, Hong Kong (CN); The Hong Kong Polytechnic University, Hong Kong (CN)

( * ) Notice: Subject to any disclaimer, the term of this patent is extended or adjusted under 35 U.S.C. 154(b) by 1042 days.

(21) Appl. No.: 17/450,838

(22) Filed: Oct. 14, 2021

(65) Prior Publication Data

US 2022/0113300 A1    Apr. 14, 2022

Related U.S. Application Data

(60) Provisional application No. 63/091,449, filed on Oct. 14, 2020.

(51) Int. Cl.
*B01L 3/00*    (2006.01)
*B01D 15/08*    (2006.01)
(Continued)

(52) U.S. Cl.
CPC ......... *G01N 33/5011* (2013.01); *C12M 23/16* (2013.01)
(Continued)

(58) Field of Classification Search
CPC ........... G01N 33/5011; G01N 2800/52; C12M 23/16; C12M 35/08; C12M 41/46;
(Continued)

(56) References Cited

U.S. PATENT DOCUMENTS

2014/0231680 A1* 8/2014 Klinec .................. G01N 35/02
250/564
2014/0340869 A1* 11/2014 Wang ........................ F21K 9/00
362/84
(Continued)

OTHER PUBLICATIONS

Khoo et al. ("Liquid biopsy and therapeutic response: Circulating tumor cell cultures for evaluation of anticancer treatment." Science advances 2.7 (2016): e1600274.) (Year: 2016).*
(Continued)

*Primary Examiner* — Jennifer Wecker
(74) *Attorney, Agent, or Firm* — S&F/WEHRW

(57) ABSTRACT

There is provided a microfluidic device comprising: a microfluidic device for preparing a cell model, comprising: a housing having at least three layers; a first inlet area at a top layer and at one end of the housing for receiving a first mixture comprising cells; a second inlet area at the top layer and at an opposite end of the housing for receiving a second mixture containing one or more agents or one or more pathogens; and a plurality of microchannels through which the first mixture and/or the second mixture flows into corresponding wells, wherein each microchannel has an end in fluid communication with the first inlet area, and another end in fluid communication with the second inlet area. There are also provided methods comprising using the device.

11 Claims, 31 Drawing Sheets
(30 of 31 Drawing Sheet(s) Filed in Color)

(51) Int. Cl.
- *B01F 33/302* (2022.01)
- *B01F 33/3033* (2022.01)
- *B01L 7/00* (2006.01)
- *B01L 9/00* (2006.01)
- *B65G 47/80* (2006.01)
- *B82Y 20/00* (2011.01)
- *B82Y 30/00* (2011.01)
- *B82Y 40/00* (2011.01)
- *C12M 1/34* (2006.01)
- *C12M 3/06* (2006.01)
- *C12N 1/14* (2006.01)
- *C12N 1/20* (2006.01)
- *C12Q 1/02* (2006.01)
- *C12Q 1/6806* (2018.01)
- *C12Q 1/6844* (2018.01)
- *C12Q 1/6848* (2018.01)
- *C12Q 1/686* (2018.01)
- *G01N 15/10* (2024.01)
- *G01N 15/14* (2024.01)
- *G01N 15/1433* (2024.01)
- *G01N 21/29* (2006.01)
- *G01N 21/65* (2006.01)
- *G01N 30/02* (2006.01)
- *G01N 30/72* (2006.01)
- *G01N 33/50* (2006.01)
- *G01N 33/543* (2006.01)
- *G01N 33/557* (2006.01)
- *G01N 33/574* (2006.01)
- *G01N 33/58* (2006.01)

(58) Field of Classification Search
CPC ....... B01L 2200/0668; B01L 3/502761; B01L 2200/0694; B01L 2200/16; B01L 2300/0829
See application file for complete search history.

(56) References Cited

U.S. PATENT DOCUMENTS

| | | | | |
|---|---|---|---|---|
| 2015/0072413 | A1* | 3/2015 | Zenhausern | C12M 29/04 156/291 |
| 2017/0336393 | A1* | 11/2017 | Wang | A61P 31/16 |

OTHER PUBLICATIONS

Römling, U. and C. Balsalobre, Biofilm infections, their resilience to therapy and innovative treatment strategies. Journal of internal medicine, 2012. 272(6): p. 541-561.

Flemming, H.-C. and J. Wingender, The biofilm matrix. Nature reviews microbiology, 2010. 8(9): p. 623-633.

Khoo, B.L., et al., Liquid biopsy and therapeutic response: Circulating tumor cell cultures for evaluation of anticancer treatment. Sci Adv, 2016. 2(7): p. e1600274.

Berthier, E., et al., Managing evaporation for more robust microscale assays. Part 2. Characterization of convection and diffusion for cell biology. Lab Chip, 2008. 8(6): p. 860-4.

Cho, E.H., et al., Characterization of circulating tumor cell aggregates identified in patients with epithelial tumors. Phys Biol, 2012. 9(1): p. 016001.

Molnar, B., et al., Circulating tumor cell clusters in the peripheral blood of colorectal cancer patients. Clin Cancer Res, 2001. 7(12): p. 4080-5.

Yu, T., et al., Fusobacterium nucleatum Promotes Chemoresistance to Colorectal Cancer by Modulating Autophagy. Cell, 2017. 170(3): p. 548-563 e16.

Zu, C. and J. Wang, Tumor-colonizing bacteria: a potential tumor targeting therapy. Crit Rev Microbiol, 2014. 40(3): p. 225-35.

Song, S., M.S. Vuai, and M. Zhong, The role of bacteria in cancer therapy - enemies in the past, but allies at present. Infect Agent Cancer, 2018. 13: p. 9.

Dejea, C.M., et al., Microbiota organization is a distinct feature of proximal colorectal cancers. Proceedings of the National Academy of Sciences, 2014. 111(51): p. 18321-18326.

Drewes, J.L., et al., High-resolution bacterial 16S rRNA gene profile meta-analysis and biofilm status reveal common colorectal cancer consortia. NPJ biofilms and microbiomes, 2017. 3(1): p. 1-12.

Dejea, C.M., et al., Patients with familial adenomatous polyposis harbor colonic biofilms containing tumorigenic bacteria. Science, 2018. 359(6375): p. 592-597.

Chua, S.L., et al., Dispersed cells represent a distinct stage in the transition from bacterial biofilm to planktonic lifestyles. Nat Commun, 2014. 5: p. 4462.

Cegelski, L., et al., Small-molecule inhibitors target Escherichia coli amyloid biogenesis and biofilm formation. Nat Chem Biol, 2009. 5(12): p. 913-9.

Devaraj, A., et al., The extracellular DNA lattice of bacterial biofilms is structurally related to Holliday junction recombination intermediates. Proc Natl Acad Sci U S A, 2019. 116(50): p. 25068-25077.

Devaraj, A., et al., DNABII proteins play a central role in UPEC biofilm structure. Mol Microbiol, 2015. 96(6): p. 1119-35.

Tetz, G.V., N.K. Artemenko, and V.V. Tetz, Effect of DNase and antibiotics on biofilm characteristics. Antimicrob Agents Chemother, 2009. 53(3): p. 1204-9.

Yousefi, S., et al., In vivo evidence for extracellular DNA trap formation. Cell Death Dis, 2020. 11(4): p. 300.

Wienkers, L.C. and T.G. Heath, Predicting in vivo drug interactions from in vitro drug discovery data. Nat Rev Drug Discov, 2005. 4(10): p. 825-33.

Hanahan, D. and R.A. Weinberg, Hallmarks of cancer: the next generation. Cell, 2011. 144(5): p. 646-74.

* cited by examiner

C

Biofilm formed in
2D Infection Model

Biofilm formed covering on UMUC-3 Clusters
in Microwell-based Infection Model

D

UMUC-3 Clusters
formed in Microwell

In situ
Hoechst/CD24/CD44
Immunostaining

MICROFLUIDIC DEVICE AND METHOD OF PREPARING A CELL MODEL FOR DISEASE ASSOCIATED WITH CANCER

CROSS-REFERENCE TO RELATED APPLICATIONS

This application claims the benefit of priority of U.S. Provisional Patent Application No. 63/091,449 filed Oct. 14, 2020, the contents of it being hereby incorporated by reference in its entirety for all purposes.

FIELD OF THE INVENTION

The invention is in the field of biomedical engineering, in particular microfluidic devices and the use of microfluidic devices for preparing cell models and screening drugs for diseases associated with cancer.

BACKGROUND OF THE INVENTION

Microorganisms, such as bacteria, are known to colonize human tumors. Despite recent studies revealing that microorganisms may affect tumor progression, detailed information about the interaction between the microorganisms and the cancer cells and its impact on cancers is still poorly understood. There is also a need to identify new drugs for better disease management in cancer patients with microbial infection.

Existing technologies, such as those drug screening assays, are largely based on cultures that only comprise cancer cells as monolayers or 3D spheroids in gels. The disease models established by conventional technologies have major drawbacks. For example, the cancer cells as monolayers are not clinically relevant; 3D spheroids in gels are usually not consistently formed and have limitations in throughput. Further, some inflammatory models only comprise cancer cells and inflammatory factors, without actual exposure to microorganisms. Other studies that involve introducing bacteria to cancer spheroids largely focus on short-term interactions of colonizing bacteria for bacteria-based anti-cancer therapy.

Therefore, there is a need to provide a suitable platform, such as a microfluidic device, that allows close resemblance of in vivo microbial infection in cancer patients for a deeper understanding of cancer-microbial interaction, high-throughput drug discovery, and better disease management.

SUMMARY OF THE INVENTION

According to a first aspect of the present invention, there is provided a microfluidic device for preparing a cell model, comprising: a housing having at least three layers; a first inlet area at a top layer and at one end of the housing for receiving a first mixture comprising cells; a second inlet area at the top layer and at an opposite end of the housing for receiving a second mixture containing one or more agents or one or more pathogens; and a plurality of microchannels through which the first mixture and/or the second mixture flows into corresponding wells, wherein each microchannel has an end in fluid communication with the first inlet area and another end in fluid communication with the second inlet area.

In an embodiment, each of the first inlet area and the second inlet area comprises a gradient region configured to load the microchannels with different concentrations of the first mixture and/or the second mixture.

In an embodiment, the gradient region is configured as a tree-like gradient generator.

In an embodiment, each of the first and second inlet areas has at least two inlet ports.

In an embodiment, each of the microchannels is in fluid communication with at least two wells for retaining cells, each of the wells has a depth of at least 150 micro-meters ($\mu m$).

In an embodiment, the first mixture comprises the cells selected from the group consisting of cancer cells, tumor cells, mesenchymal cells, epithelial cells, stem cells, immune cells, tumor-associated cells, and any combination thereof.

In an embodiment, the cells are colon cancer cells, bladder cancer cells, breast cancer cells, prostate cancer cells, ovarian cancer cells, cervix cancer cells, squamous cancer cells, lung cancer cells, pancreatic cancer cells, stomach cancer cells, kidney cancer cells or liver cancer cells.

In an embodiment, the first mixture further comprises a first pathogen.

In an embodiment, the one or more pathogens are selected from the group consisting of one or more bacteria, one or more viruses, one or more fungi, one or more alga, one or more protozoans and other microorganisms, or wherein the one or more agents are selected from the group consisting of one or more antimicrobial agents, one or more antibiotics, one or more biofilm dispersal agents, one or more anti-cancer drugs, and a combination thereof.

In an embodiment, the first pathogen is selected from the group consisting of a bacterium, a virus, a fungus, an algae, a protozoan and other microorganism.

In an embodiment, the one or more pathogens are one or more bacteria.

In an embodiment, the first pathogen is a bacterium.

According to a second aspect of the present invention, there is provided a method for establishing a cell model for a disease, comprising: providing a microfluidic device as described herein; adding cells to the microfluidic device; and culturing said cells in the microfluidic device to establish the cell model.

In an embodiment, the method further comprises adding a pathogen to the microfluidic device; culturing the pathogen with said cells; and analyzing one or more effects of the pathogen on said cells, one or more interactions between the pathogen and said cells, or both.

In an embodiment, the pathogen is added after the addition of the cells.

In an embodiment, the cells form a cell cluster prior to the addition of the pathogen.

In an embodiment, the cells and the pathogen are added concurrently.

In an embodiment, the cells and the pathogen form a cluster comprising cells and pathogen.

In an embodiment, the disease is cancer, or a disease associated with cancer, or both, and wherein the cells are cancer cells or cancer-associated cells.

In an embodiment, the cancer cells are selected from the group consisting of colon, bladder, breast, prostate, ovarian, cervical, squamous, lung, pancreatic, stomach, kidney, and liver cancer cells.

In an embodiment, the pathogen is selected from the group consisting of a bacterium, a virus, a fungus, an algae, a protozoan or other microorganisms.

According to a third aspect of the present invention, there is provided a method for identifying one or more agents or one or more pathogens for treatment of a disease, comprising: providing a microfluidic device as described herein; adding cells, or cells and a pathogen to the microfluidic device; culturing said cells, or said cells and pathogen in the microfluidic device to establish a cell model; adding one or more agents or pathogens to the cell model; monitoring one or more characteristics of said cells, pathogens, or both and comparing the one or more characteristics with a reference; and identifying the one or more agents or the one or more pathogens for treatment of the disease based on a change in the one or more characteristics relative to the reference.

In an embodiment, the one or more agents or the one or more pathogens are selected from the group consisting of one or more antimicrobial agents, one or more antibiotics, one or more biofilm dispersal agents, one or more anticancer drugs, one or more bacteria, one or more viruses, one or more funguses, one or more alga, one or more protozoans, one or more other microorganisms, one or more small molecules, or combinations thereof.

In an embodiment, the disease is cancer, or a disease associated with cancer, or both, and wherein the cells are cancer cells or cancer-associated cells.

According to a fourth aspect of the present invention, there is provided a method for treating a disease in a subject in need thereof, comprising administering the one or more agents or the one or more pathogens identified according to the method as described herein.

According to a fifth aspect of the present invention, there is provided a method for predicting a response to a combinational therapy in a subject in need thereof, comprising: providing a microfluidic device as described herein; adding a sample obtained from the subject to the microfluidic device, wherein the sample comprises cells, or cells and a pathogen; culturing said cells, or said cells and pathogen in the microfluidic device to establish a cell model; detecting the presence of bacterial biofilm; adding a combinational therapy to the cell model; monitoring one or more characteristics of said cells, pathogen, or both and comparing the one or more characteristics with a reference; and predicting the response based on a change in the one or more characteristics relative to the reference.

Definitions

As used herein, the term "microfluidics" or its equivalent refers to the science of designing, manufacturing, and formulating devices and processes that deal with small volumes of fluid that may be on the order of microlitres, nanolitres, or picolitres. Microfluidic devices comprise channels on a micrometer scale and are capable of high levels of automation, reduced processing times, and lower consumption of samples and reagents.

The term "fluid communication" as used herein may refer to the communication of liquid. The liquid referred to herein may be a solution, such as an aqueous solution, or a mixture, such as a cell or bacteria culture mixture.

As used herein, the term "cancer cells" refers to cells that continually divide, forming tumors. The cancer cells may have different degrees of invasiveness and metastatic potential. Some cancer cells may be less invasive with an "epithelial" phenotype. The epithelial cancer cells may express epithelial markers, such as E-cadherin. Some cancer cells may be more invasive with a "mesenchymal" phenotype. The mesenchymal cells may express mesenchymal markers, such as Vimentin. The cancer cells may also be cancer stem cells, which are cancer cells that possess characteristics associated with normal stem cells. Cancer stem cells are correlated with the cancer cell self-renewal and cancer metastasis. The cancer stem cells may express cancer stemness markers, such as CD24 and CD44.

As used herein, the term "biofilm" refers to a collective of microorganisms that attach to each other and often also adhere to a surface. For example, a biofilm may be formed on the surface of the tumor tissue. These adherent microorganisms may be embedded within extracellular polymeric substances (EPS), a matrix that is generally composed of extracellular DNA, proteins, and polysaccharides. The biofilm typically has three dimensional (3D) structure. The formation of a biofilm may confer increased antibiotic resistance compared to their planktonic counterparts (free-living microorganisms).

As used herein, a "colonizing" microorganism refers to the distribution form and location in the host community, such as a cluster of cancer cells. For example, a colonizing bacterium may infiltrate a tumor. In contrast, a "non-colonizing" bacterium tends to present on the surface of a tumor tissue, which could be in the form of biofilms. A single bacteria strain can be both colonizing and non-colonizing under specific circumstances, i.e., influenced by external factors such as culture conditions.

As used herein, a "cell model" refers to an in vitro disease model. The cell model may represent one or more the pathological and/or physiological characteristics of a disease in vivo. For example, a cell model may be an in vitro model for cancer or microbial infection in a cancer patient.

As used herein, the term "multiplicity of infection (MOI)" refers to the ratio of the infectious microorganism to infection targets, such as cells. For example, MOI may refer to the ratio of bacteria to cancer cells added during infection.

As used herein, the term "screening" in the context of drug discovery refers to the analysis or testing of candidates for one or more characteristics. Screening involves testing each group candidate, such as different antibiotics, anticancer drugs, biofilm dispersing agents, agents without known therapeutic activities, or a combination thereof, for one or more characteristics.

The articles "a", "an" and "the" are used to refer to one or to more than one (i.e., at least one) of the grammatical object of the article.

As disclosed herein, "tumor" and "cancer" may be used interchangeably.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be better understood with reference to the detailed description when considered in conjunction with the non-limiting examples and the accompanying drawings, in which.

Two inlets allow parallel inflow of bacteria and culture medium. (C) Comparison of biofilms (UTI89) formed in the 2D infection model (left) and the microfluidic model (right). Scale bar, 100 µm. 3D structured biofilms formed in the microfluidic device are more representative of biofilms in vivo. (D) Representative cell clusters in the microwell under phase-contrast imaging (left) and fluorescence imaging (right) 24 h after seeding. The clusters were stained in situ with nuclear dye Hoechst (blue) and antibodies targeting the surface markers of cancer stem cells, CD24 (green), and CD44 (red), as labeled by immunostaining. Scale bar, 50 µm.

Figure 3:
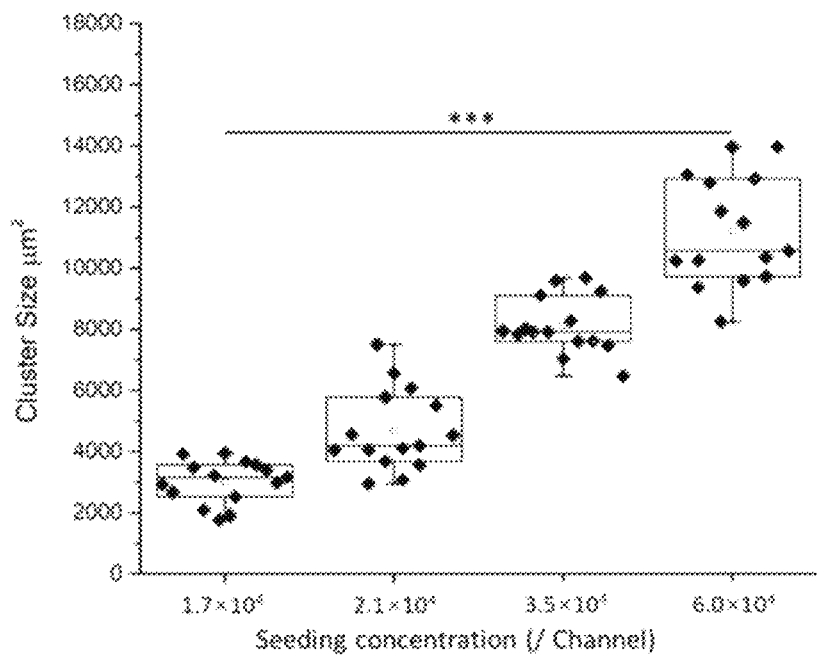
Figure 3:
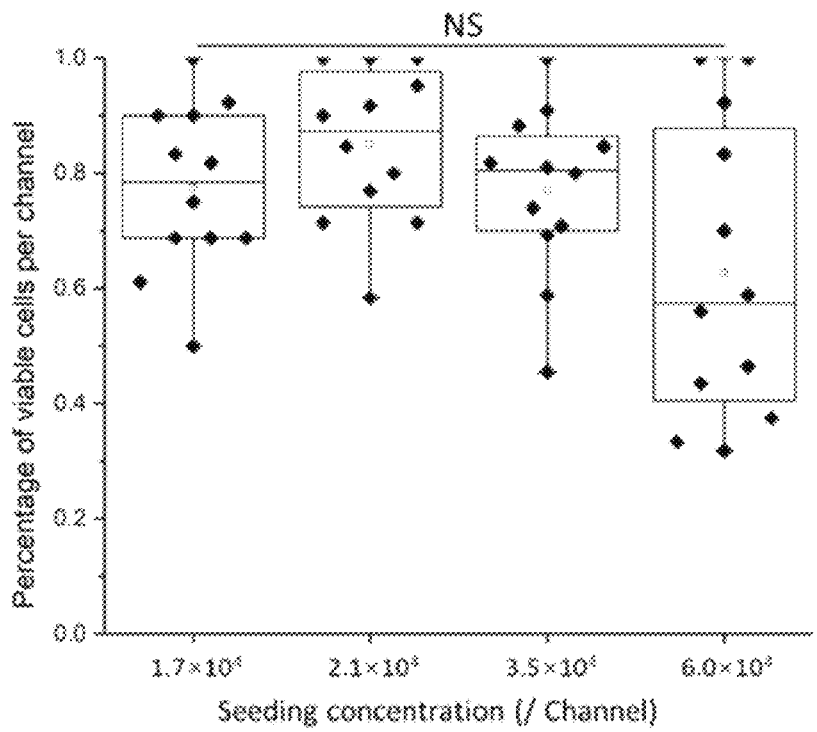
Figure 3:
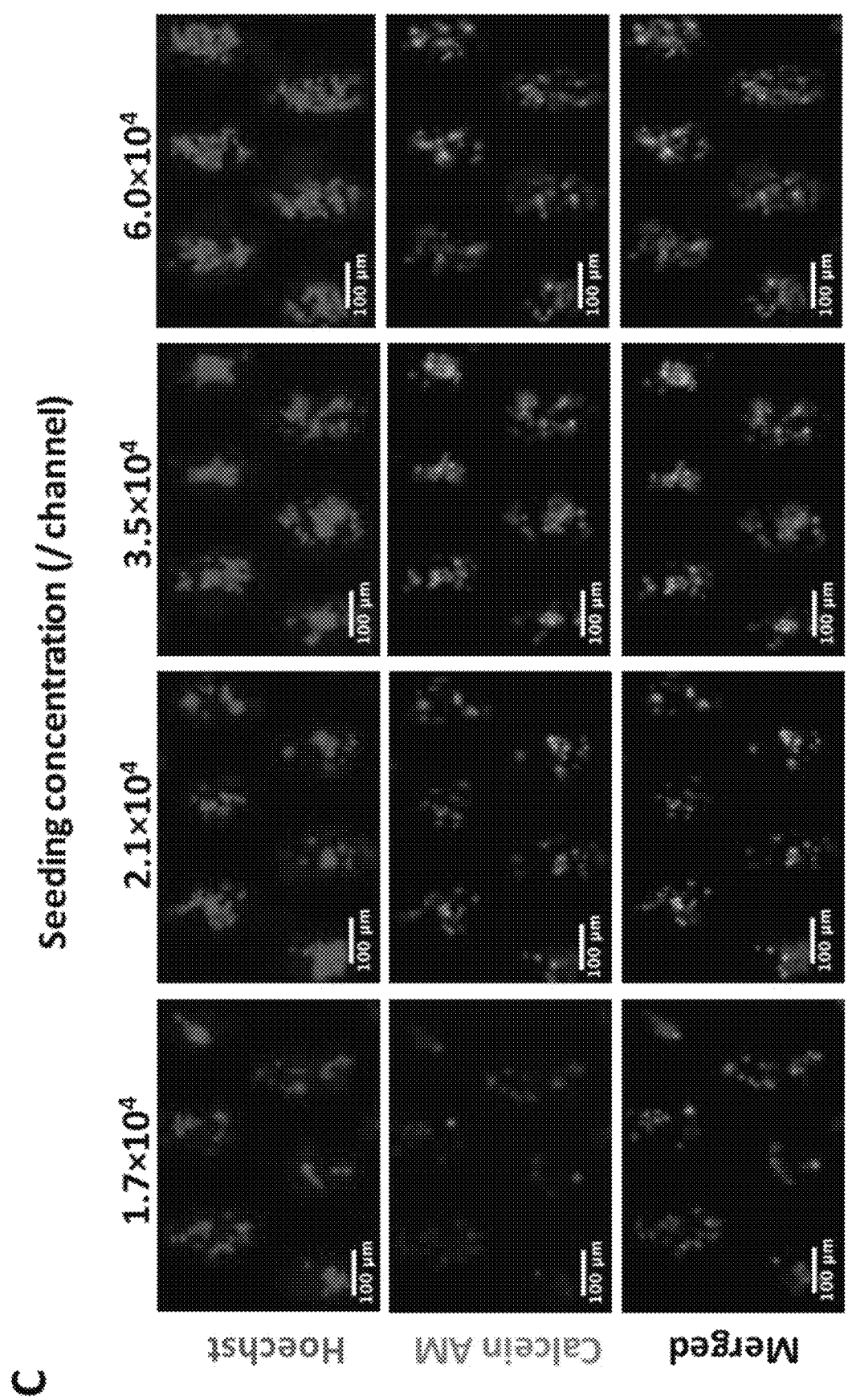

FIG. 3 Based on the culture parameters obtained from a range of seeding concentrations ($1.7 \times 10^4$-$6.0 \times 10^4$ cells per ml), $3.5 \times 10^4$ cells per ml was selected as the optimized concentration. (A) Cluster size at different seeding concentrations, which demonstrates an increasing trend within higher seeding concentrations. (B) Cell viability of different seeding concentrations, in which the viability of range at $1.7 \times 10^4$-$3.5 \times 10^4$ are all more than 75%. (C) Representative images of clusters stained with Calcein AM (green) and Hoechst (blue) at different seeding concentrations. Scale bar, 100 µm.

Figure 4:
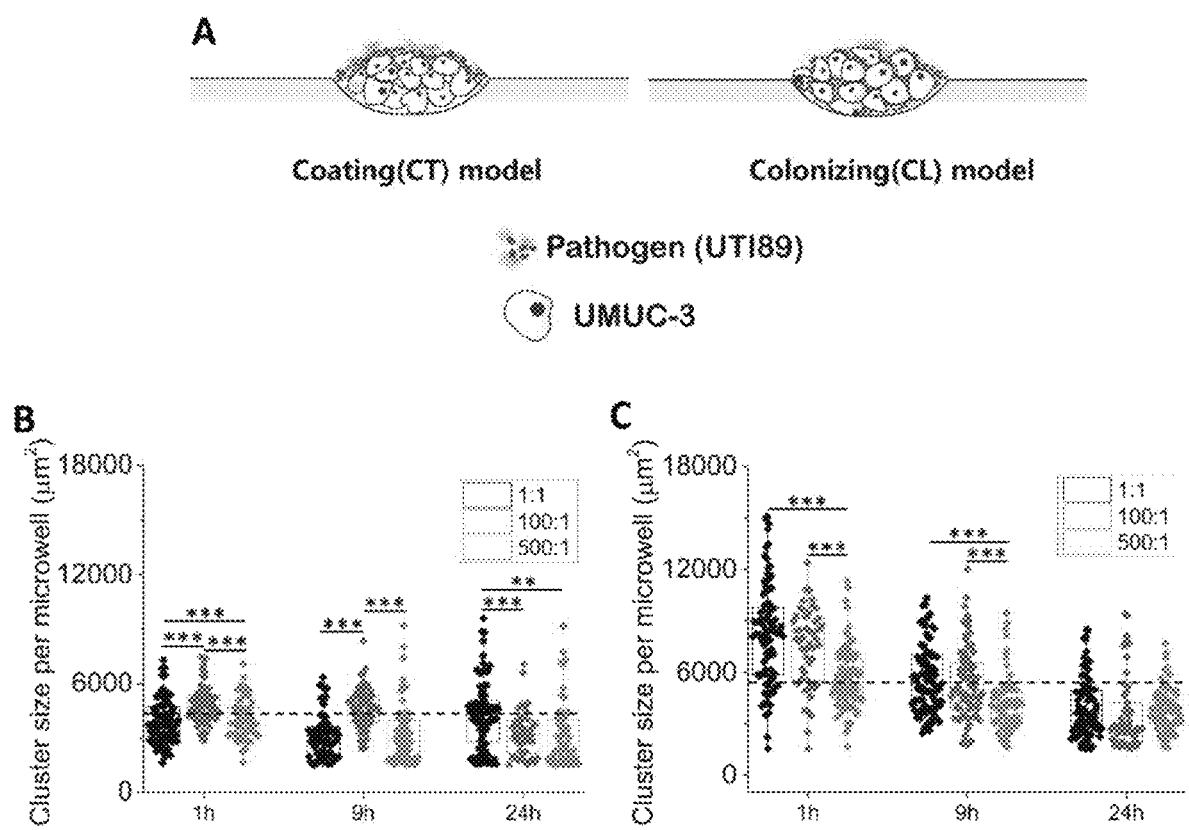

FIG. 4 The morphological changes of tumors under the presence of bacterial inflammation. Clusters become smaller and denser in the presence of inflammation. (A) Both in vitro bacteria colonizing (CL) and coating (CT) models were established using the microfluidic PIEB platform, which demonstrates different bacteria-tumor interactions under well-defined conditions. (B) Box plot of cluster size obtained 24 h after infection under MOI 500:1, 100:1, and 1:1, using the CT model. The dotted line indicates the average cluster size obtained before infection ($4319.10 \pm 2024.48$ µm$^2$). (C) Box plot of cluster size obtained 24 h after infection under MOI 500:1, 100:1, and 1:1, using the CL model. The dotted line indicates the average cluster size obtained before infection ($5787.00 \pm 2431.28$ µm$^2$). Cancer clusters became significantly denser under prolonged infection periods (9-24 h). * states for p values of <0.001;  states for p values of <0.01, * states for p values of <0.05.

Figure 5:
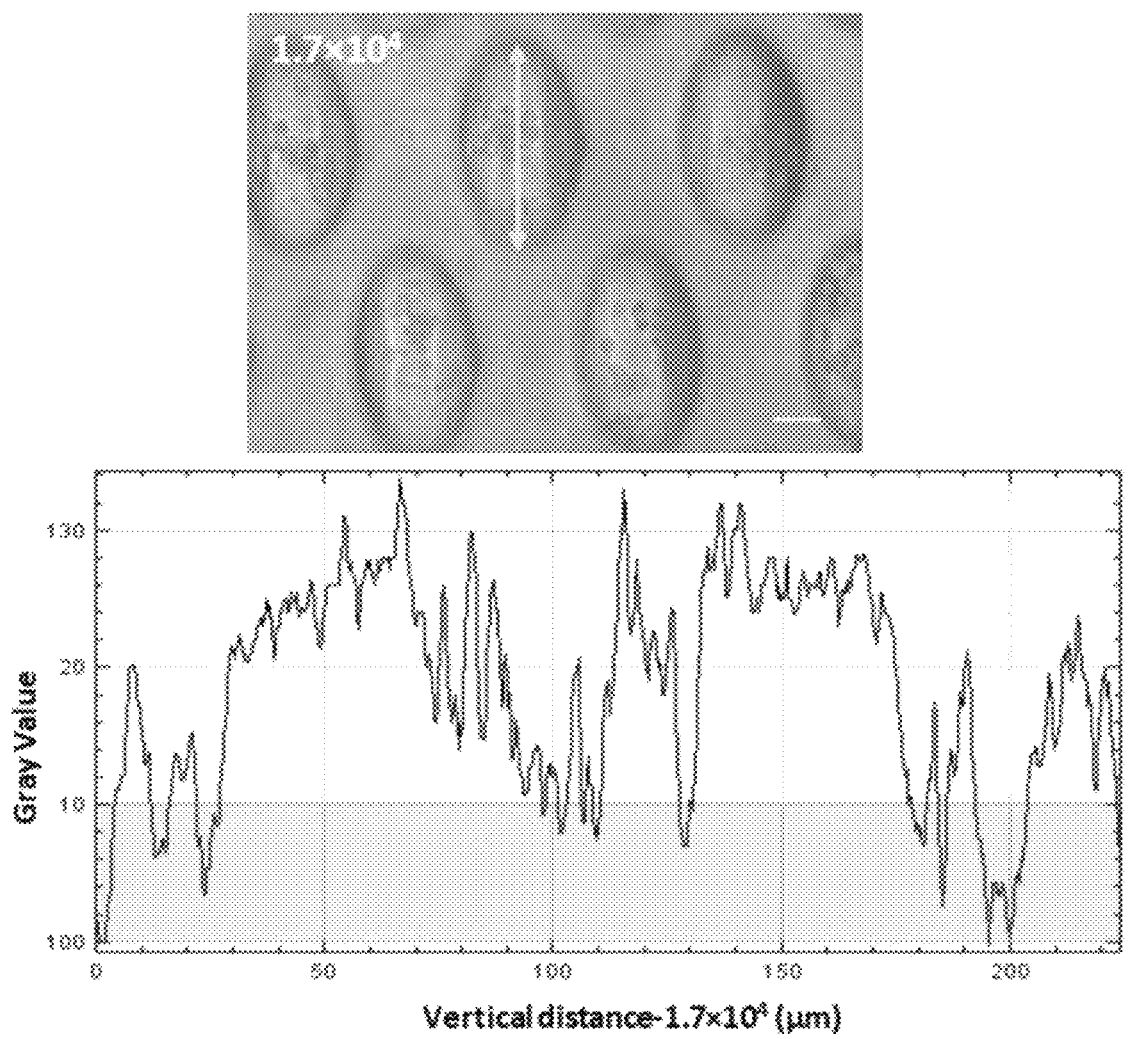
Figure 5:
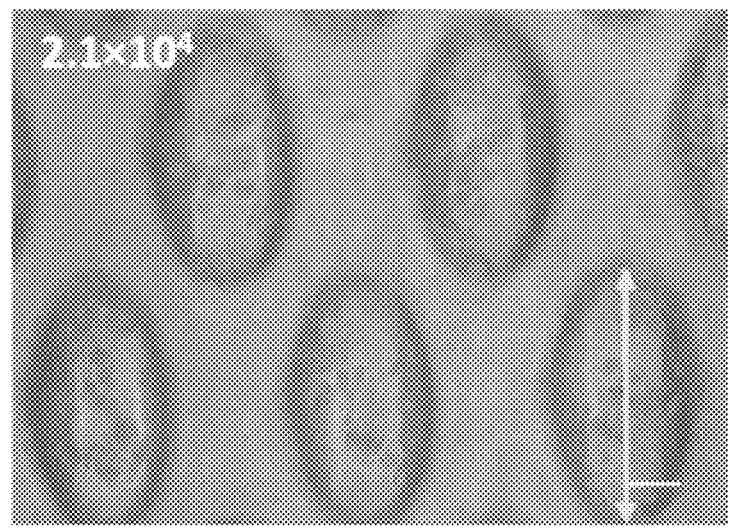
Figure 5:
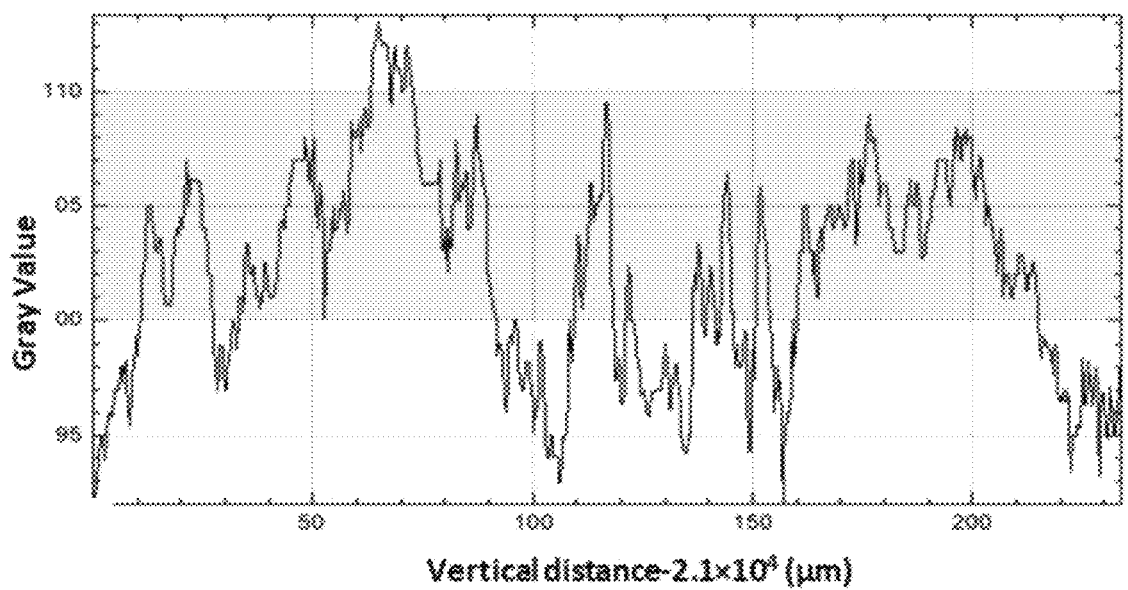
Figure 5:
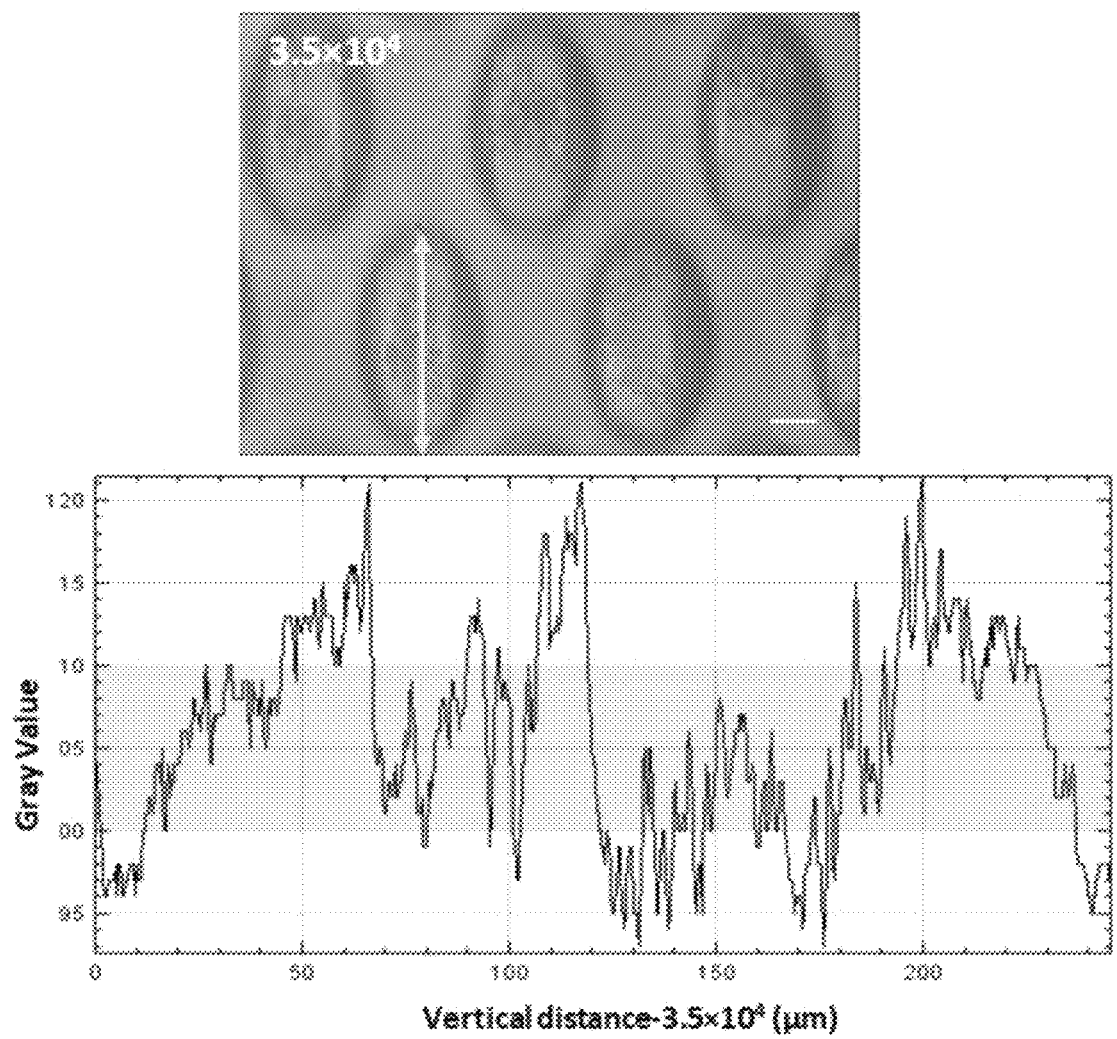
Figure 5:
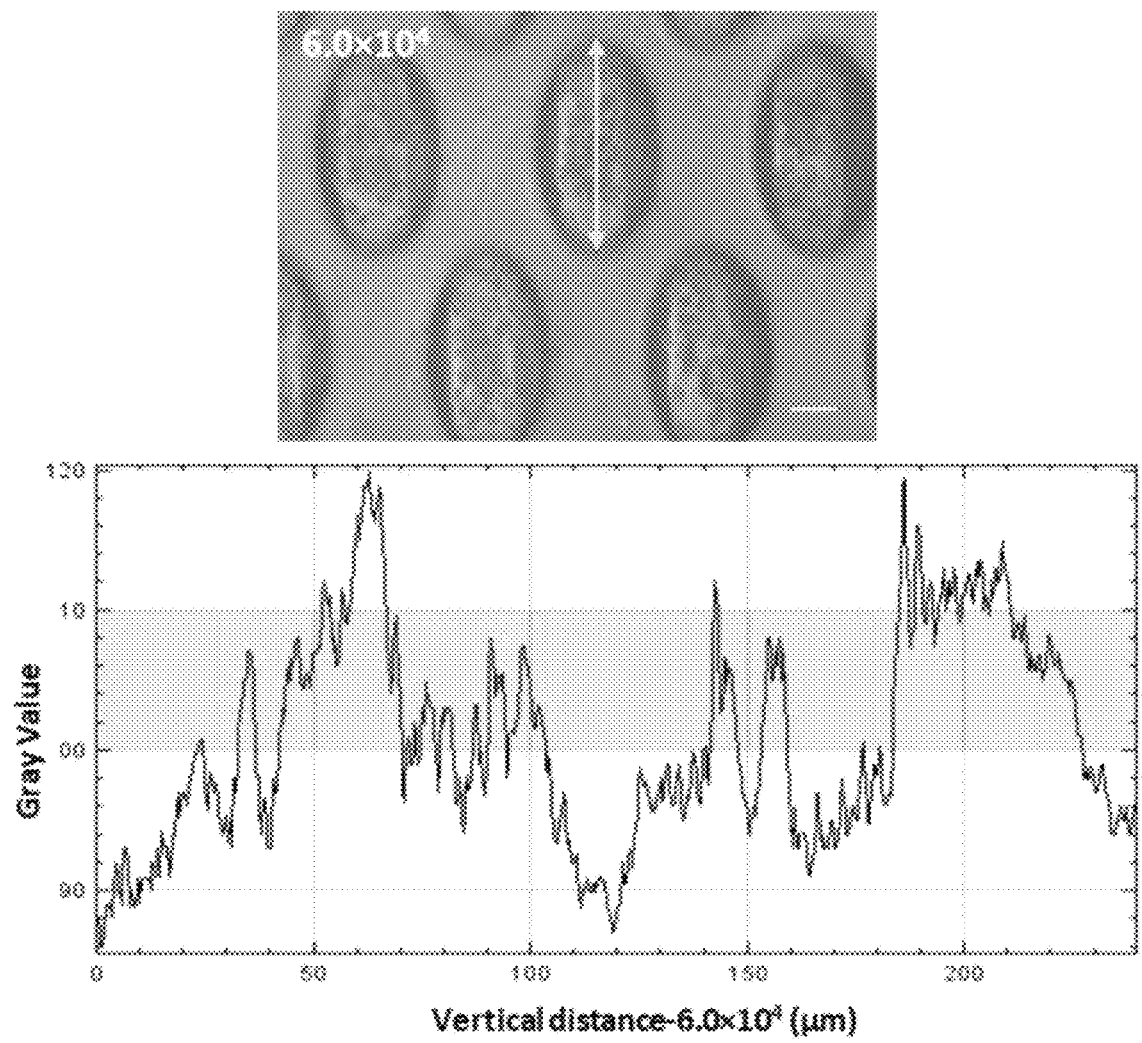

FIG. 5 The gray values of representative clusters formed under different seeding concentrations. Scale bar, 50 µm. * states for p values of <0.001;  states for p values of <0.01, * states for p values of <0.05.

Figure 6:
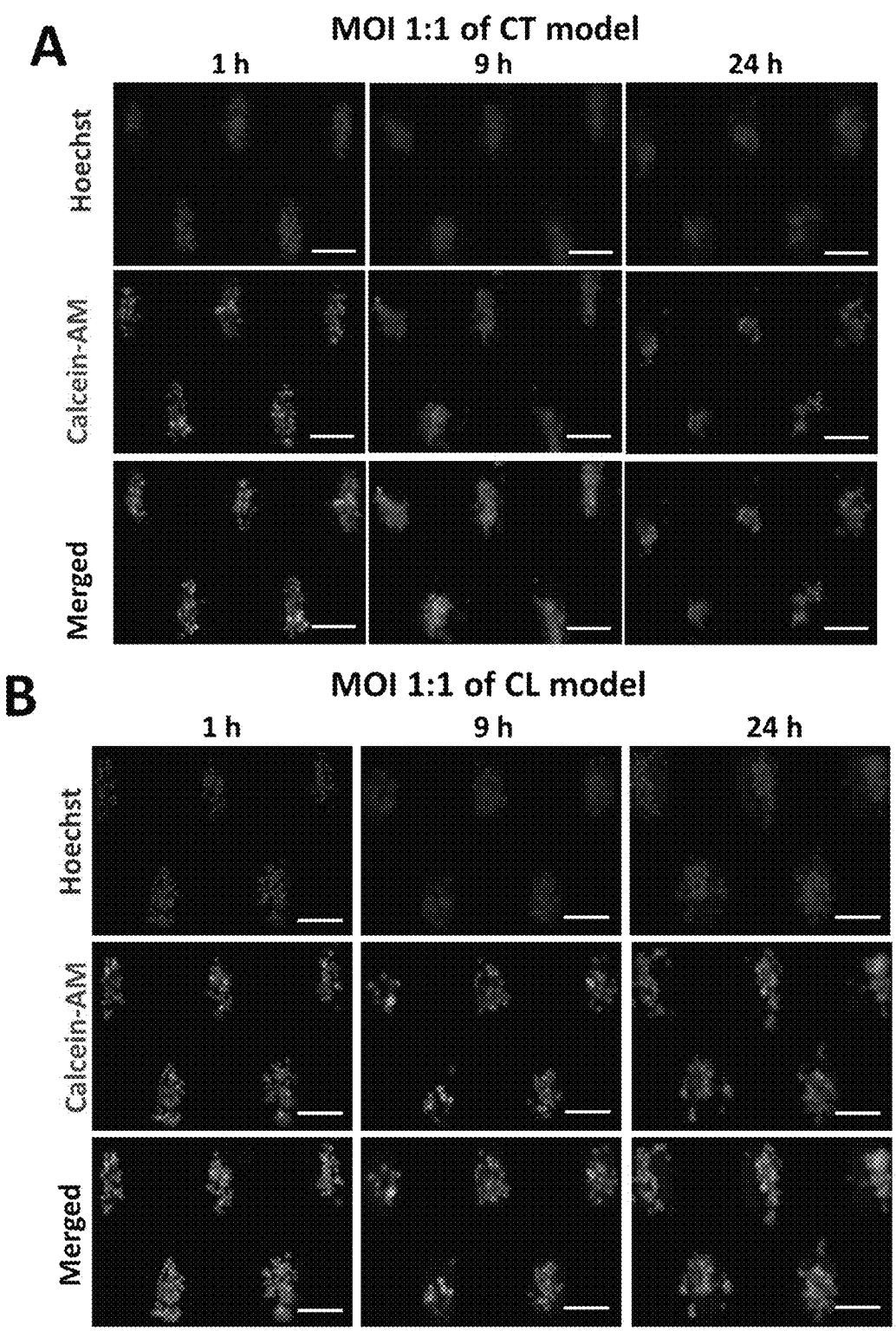
Figure 6:
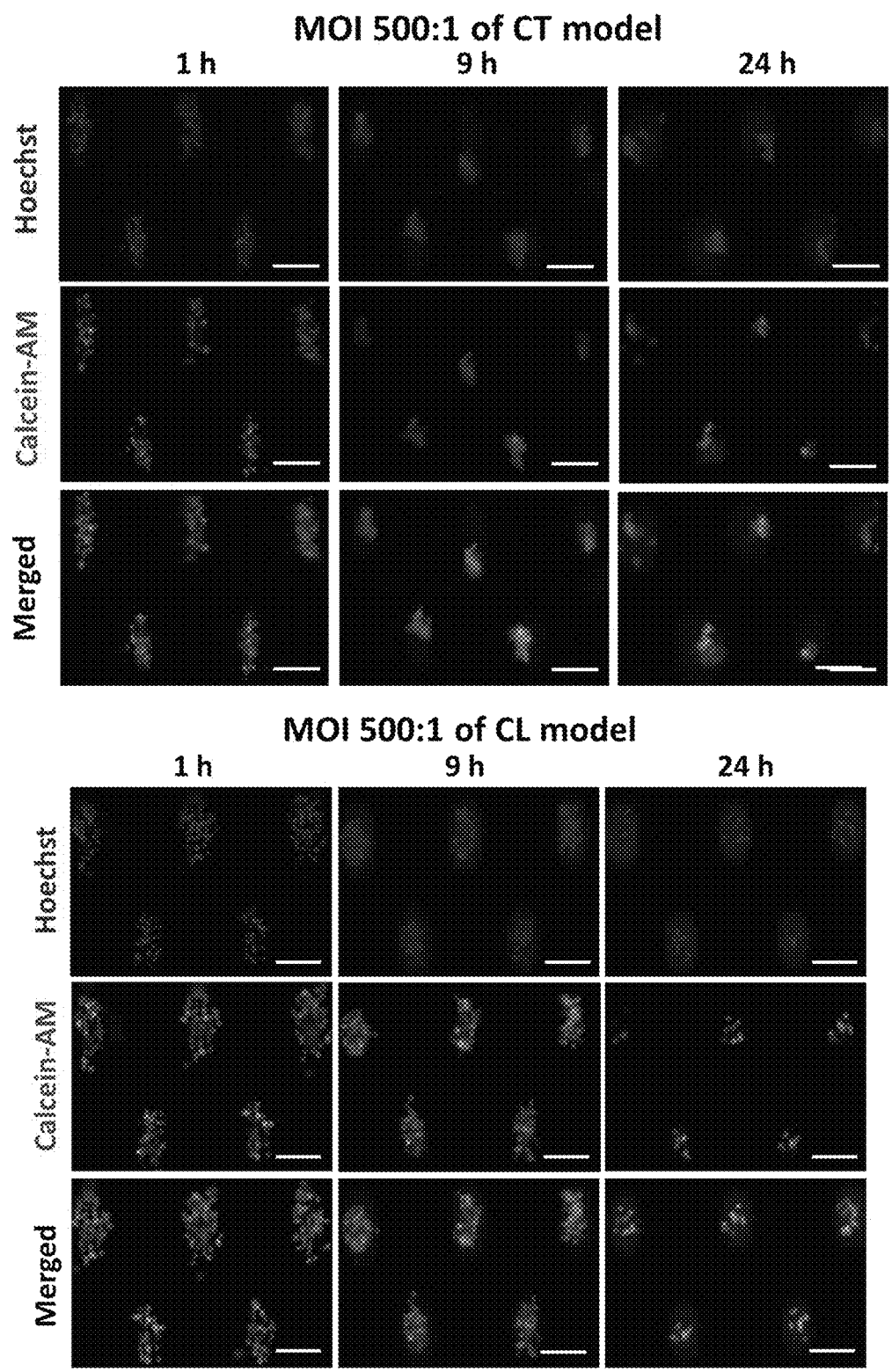
Figure 6:
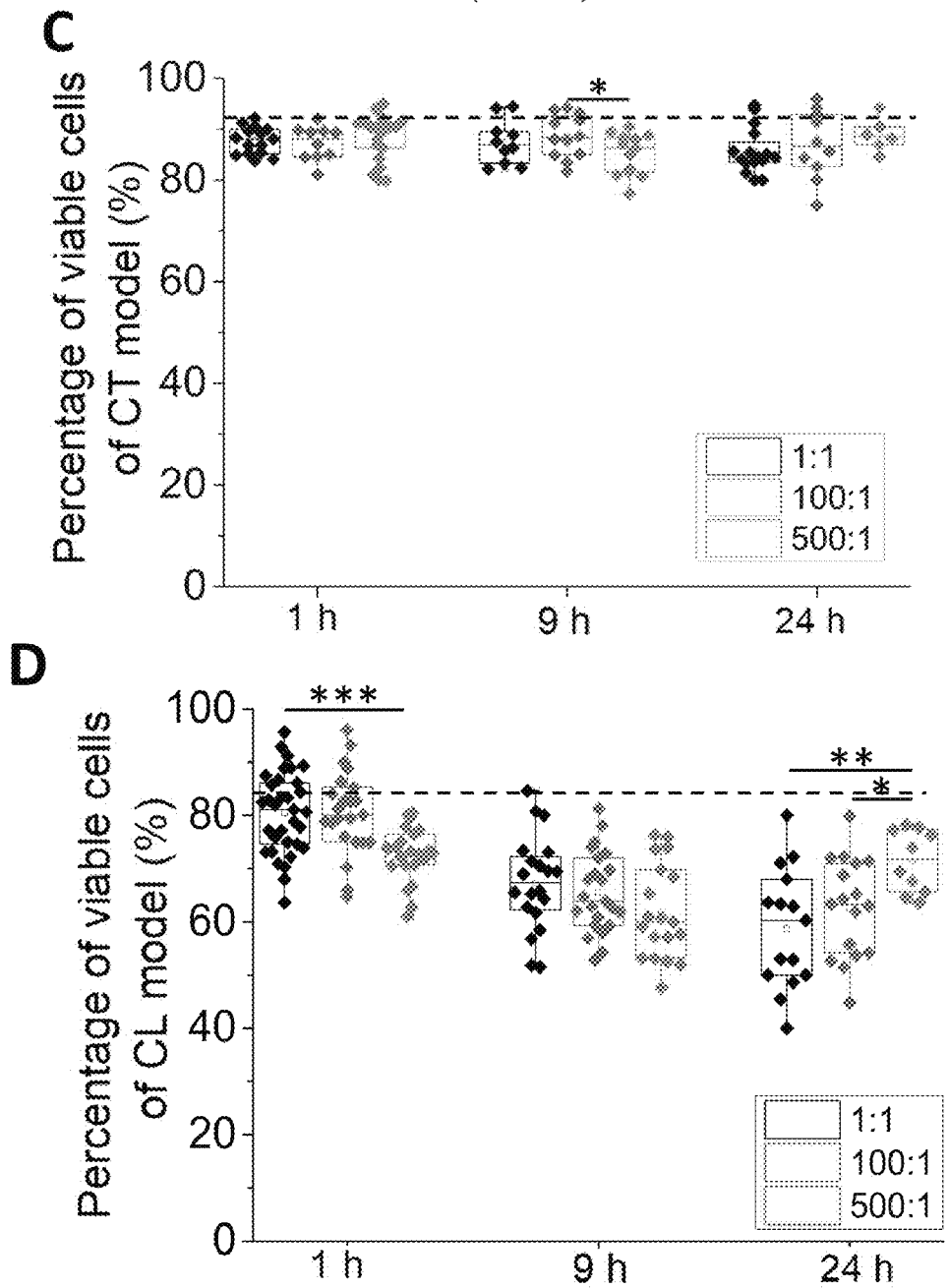

FIG. 6 Changes in tumor viability in the case of bacterial inflammation. Representative images of clusters stained with Calcein-AM (green) and Hoechst (blue) for the CL models (A) and CT models (B), respectively. Scale bar, 100 µm. (C) Box plot of cell viability with the CT model after 24 h of infection under the MOIs of 500:1, 100:1, and 1:1. The dotted line indicated the average viability of the uninfected control group corresponding to the CT model ($92.10 \pm 5.07\%$). (D) Box plot of cell viability with the CL model after 24 h of infection under the MOIs of 500:1, 100:1, and 1:1. The dotted line indicated the average viability of the uninfected control group corresponding to the CL model ($84.69 \pm 5.61\%$). * states for p values of <0.001;  states for p values of <0.01, * states for p values <0.05.

Figure 7:
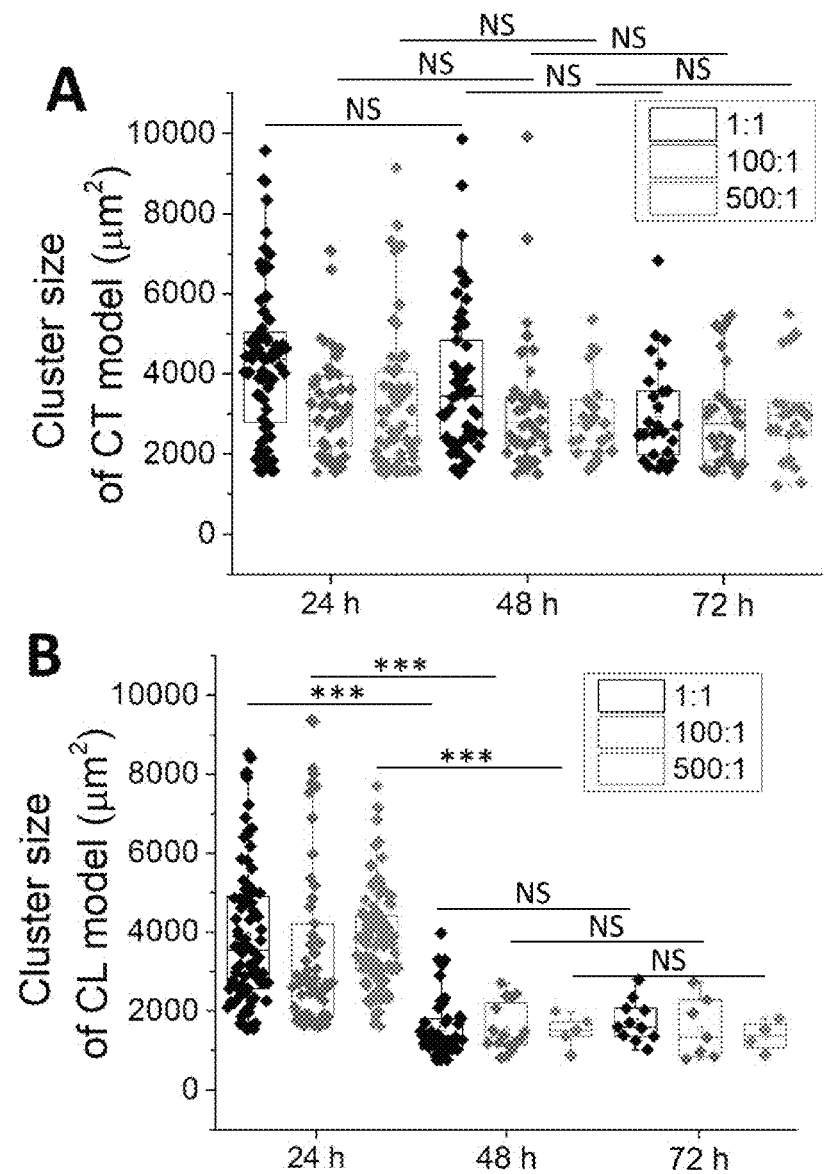
Figure 7:
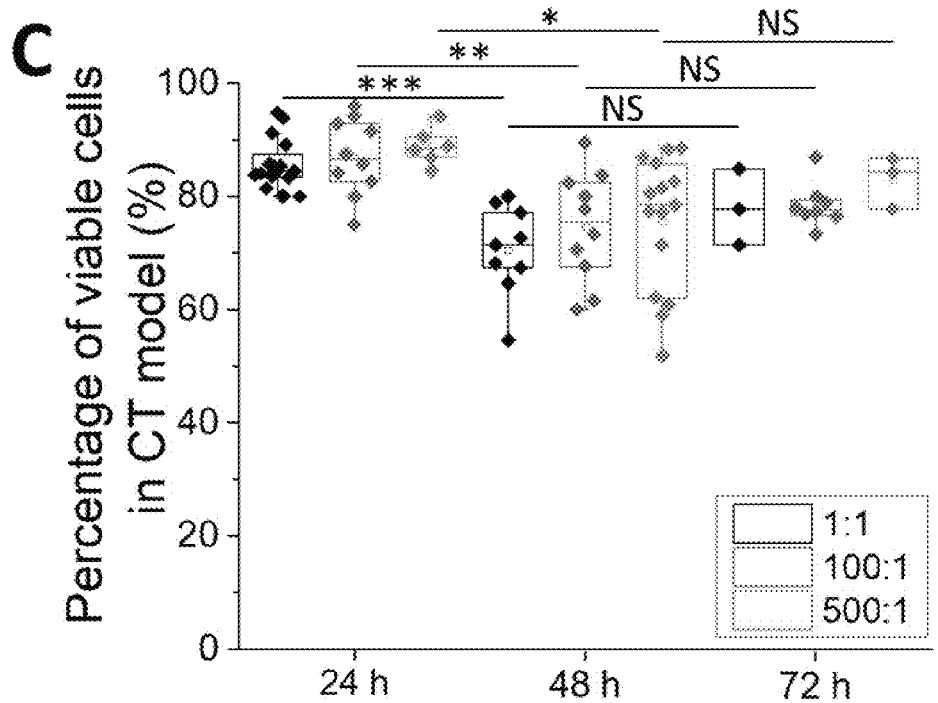
Figure 7:
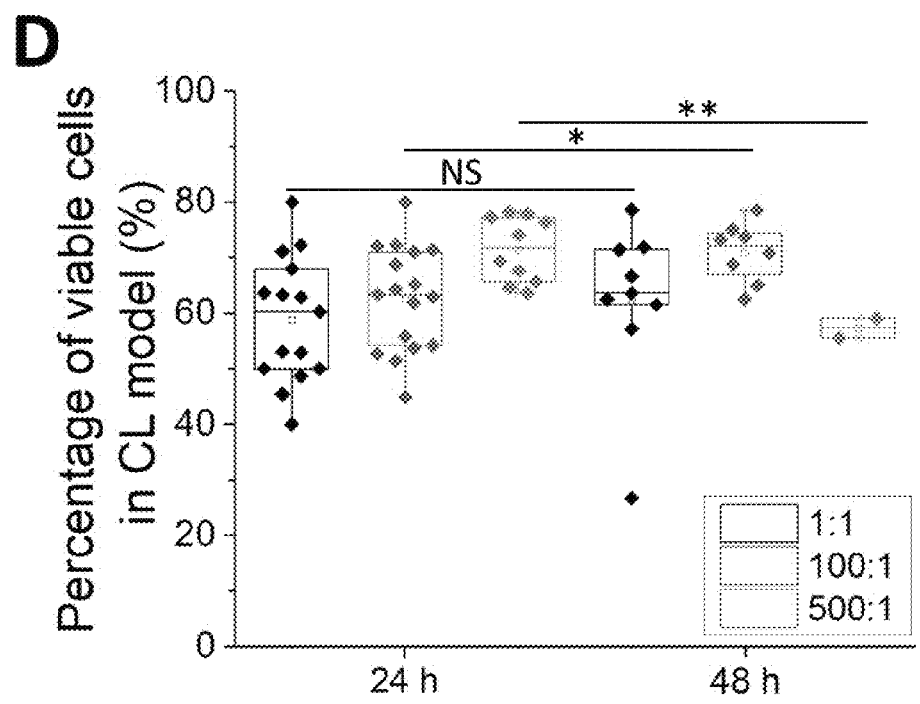

FIG. 7 Trends of cluster morphology and cell viability after more than 24 h of infection. Cluster size per microwell under various MOIs in CT model (A) and CL model (B) at 48 h and 72 h after infection. Cell viability under various MOIs in CT model (C) and CL model (D) at 48 h and 72 h after infection. * states for p values of <0.001;  states for p<0.01; * states for p<0.05; NS=not significant.

Figure 8:
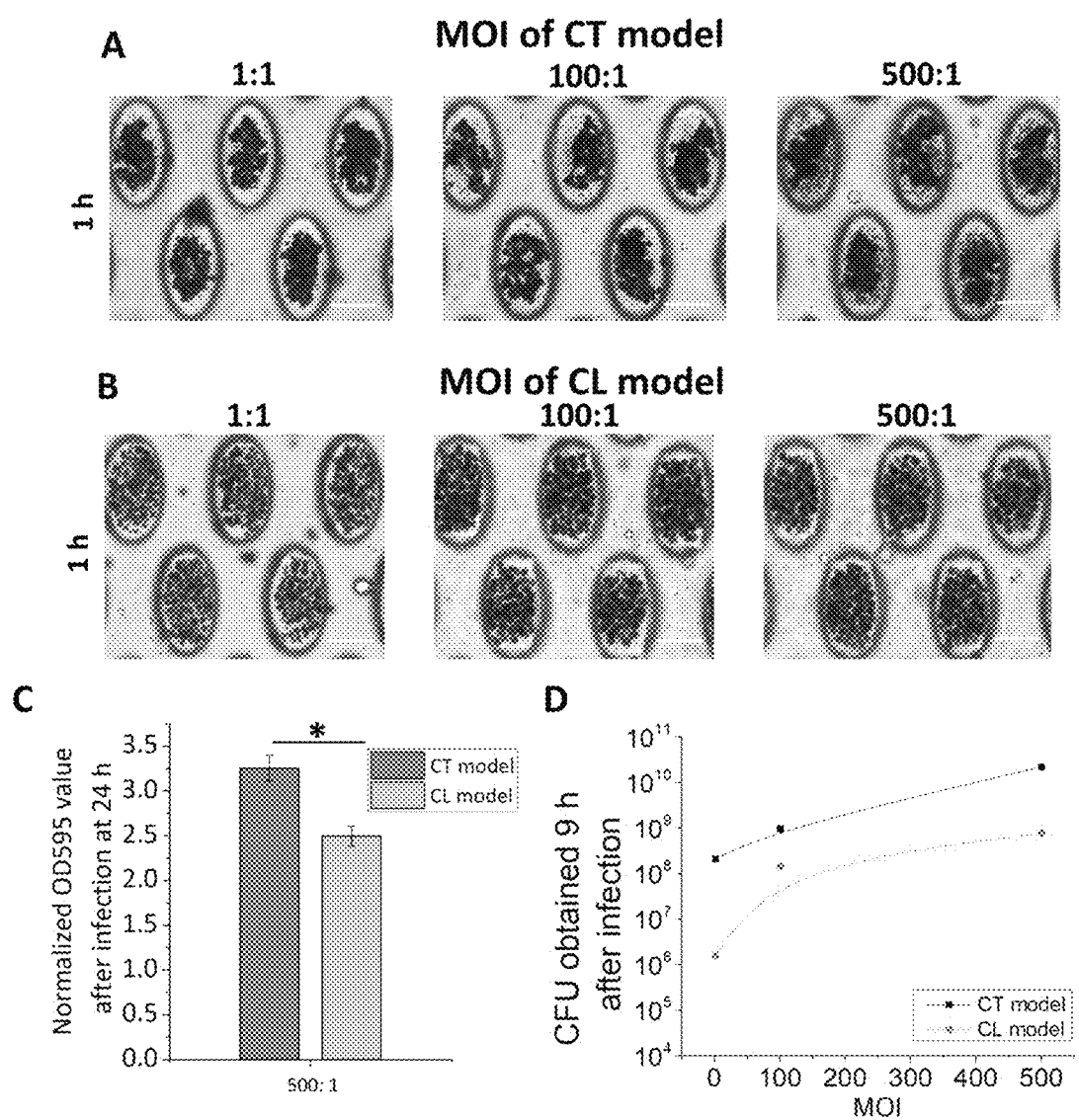

FIG. 8 Different locations of bacteria in cancer cell clusters will lead to different characteristics of bacterial growth. As shown by crystal violet (CV) staining, (A) CT and (B) CL infection models had significantly different degrees of biofilm formation after 1 h of infection. Scale bar, 100 µm. (C) OD595 values of solubilized CV from CT and CL models 24 h after infection under MOI 500:1 normalized to uninfected control group (D) CFU was obtained 9 h after infection to estimate the amount of biofilm in the CT and the CV models.

Figure 9:
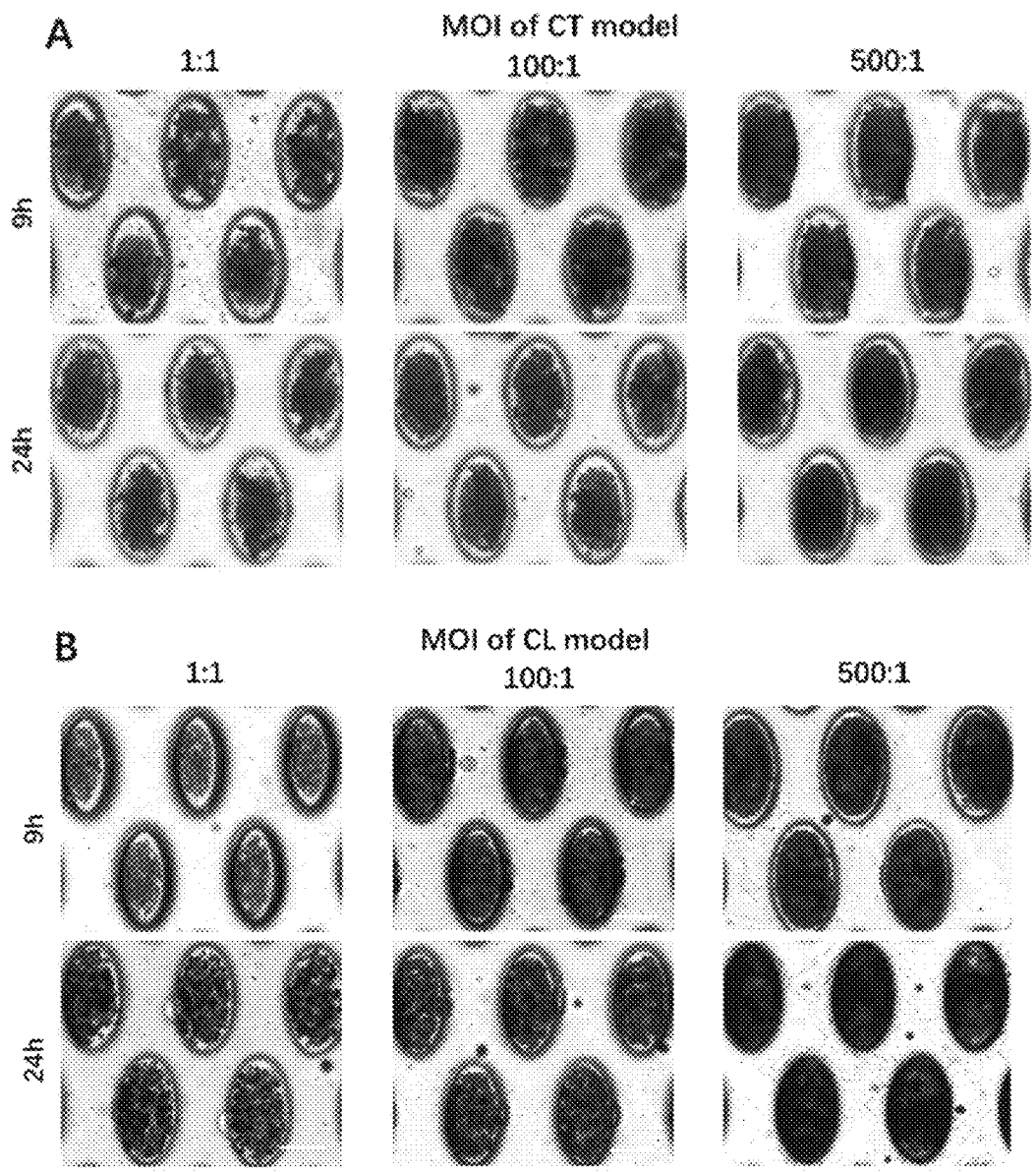
Figure 9:
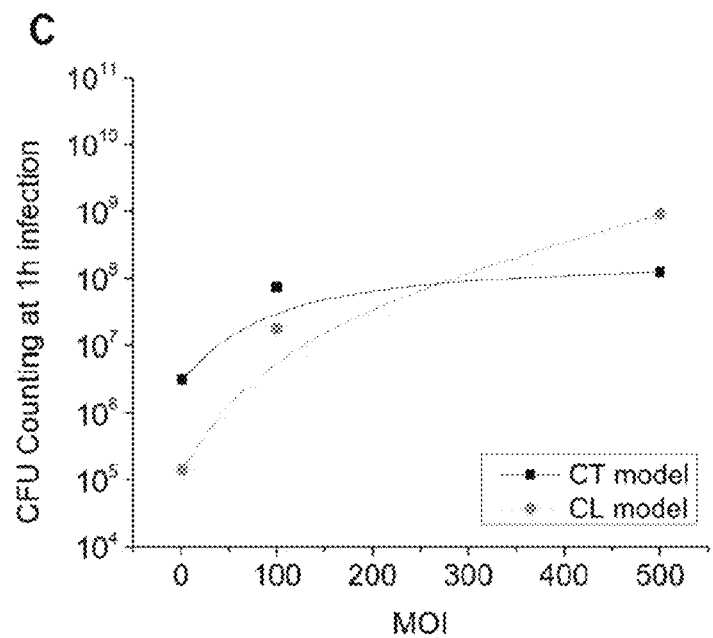
Figure 9:
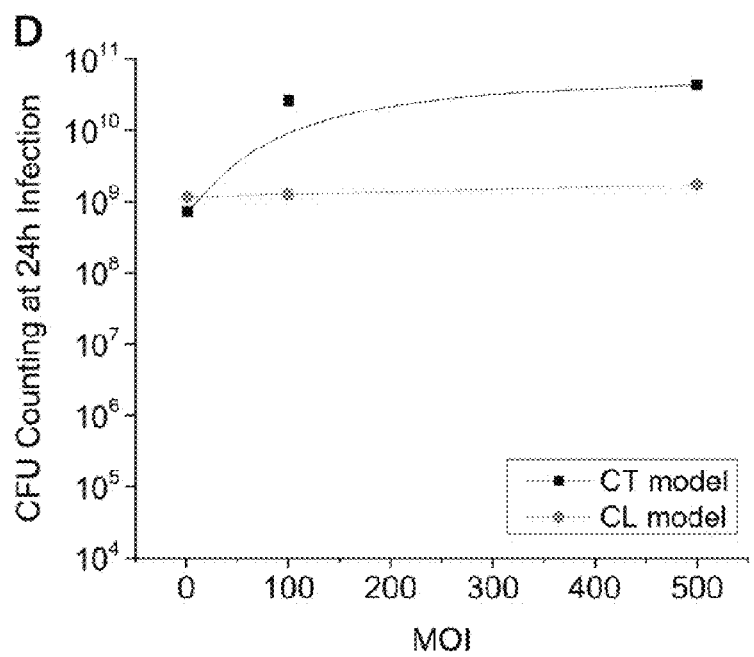

FIG. 9 Different biofilm formations between (A) CT and (B) CL infection models at 9 h infection and 24 h infection, as demonstrated by crystal violet (CV) staining. Scale bar, 100 µm. CFU counts at 1 h infection (C) and 24 h infection (D) to quantify the different biofilm forms in the CT and CL models.

Figure 10:
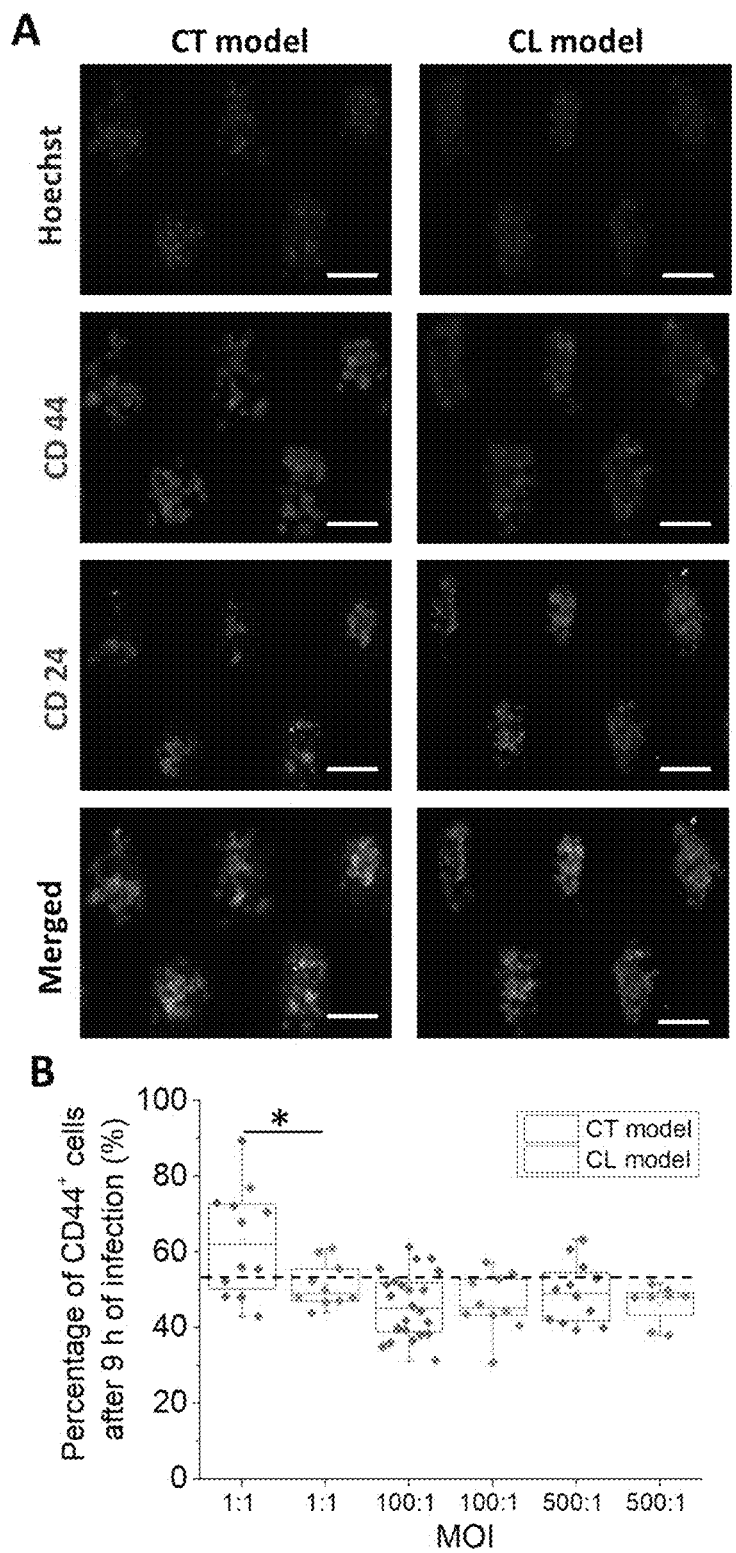
Figure 10:
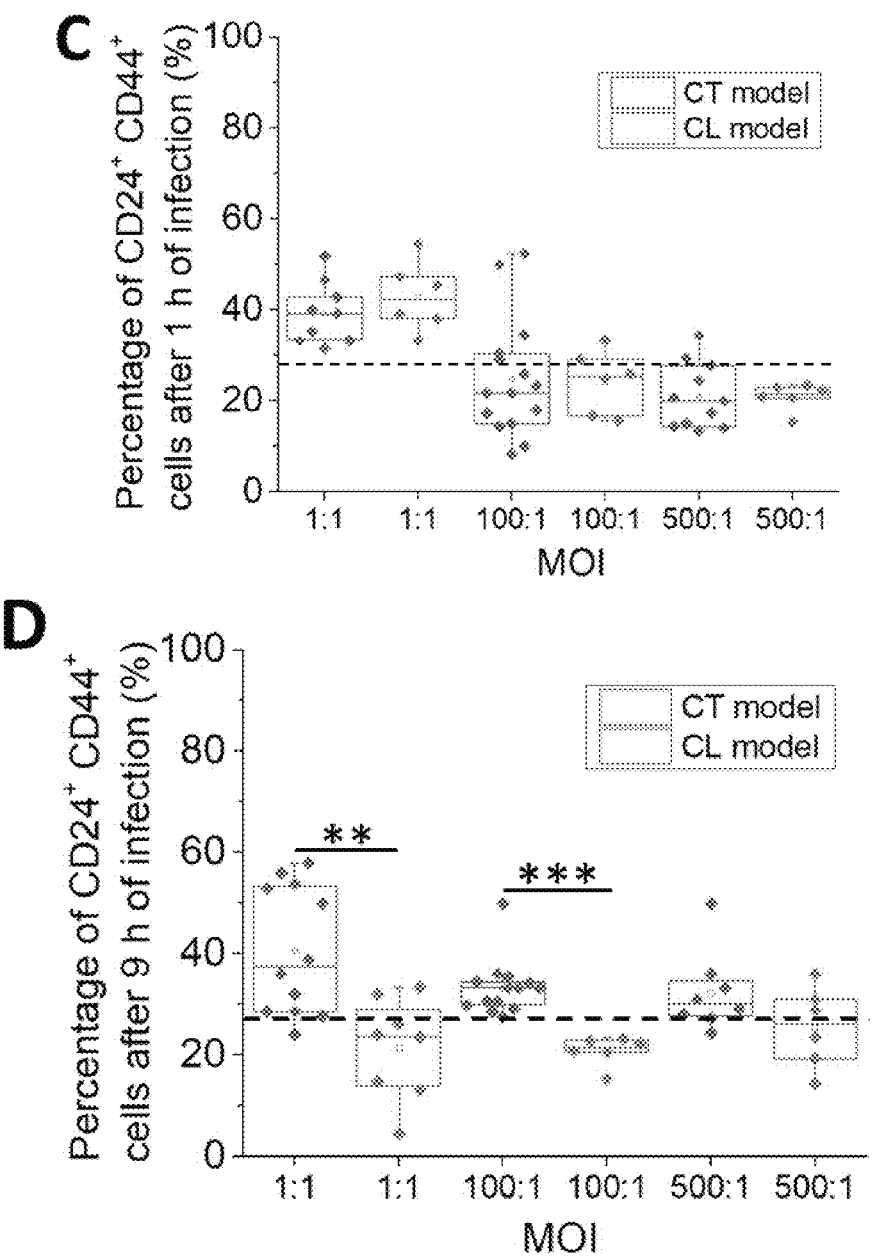
Figure 10:
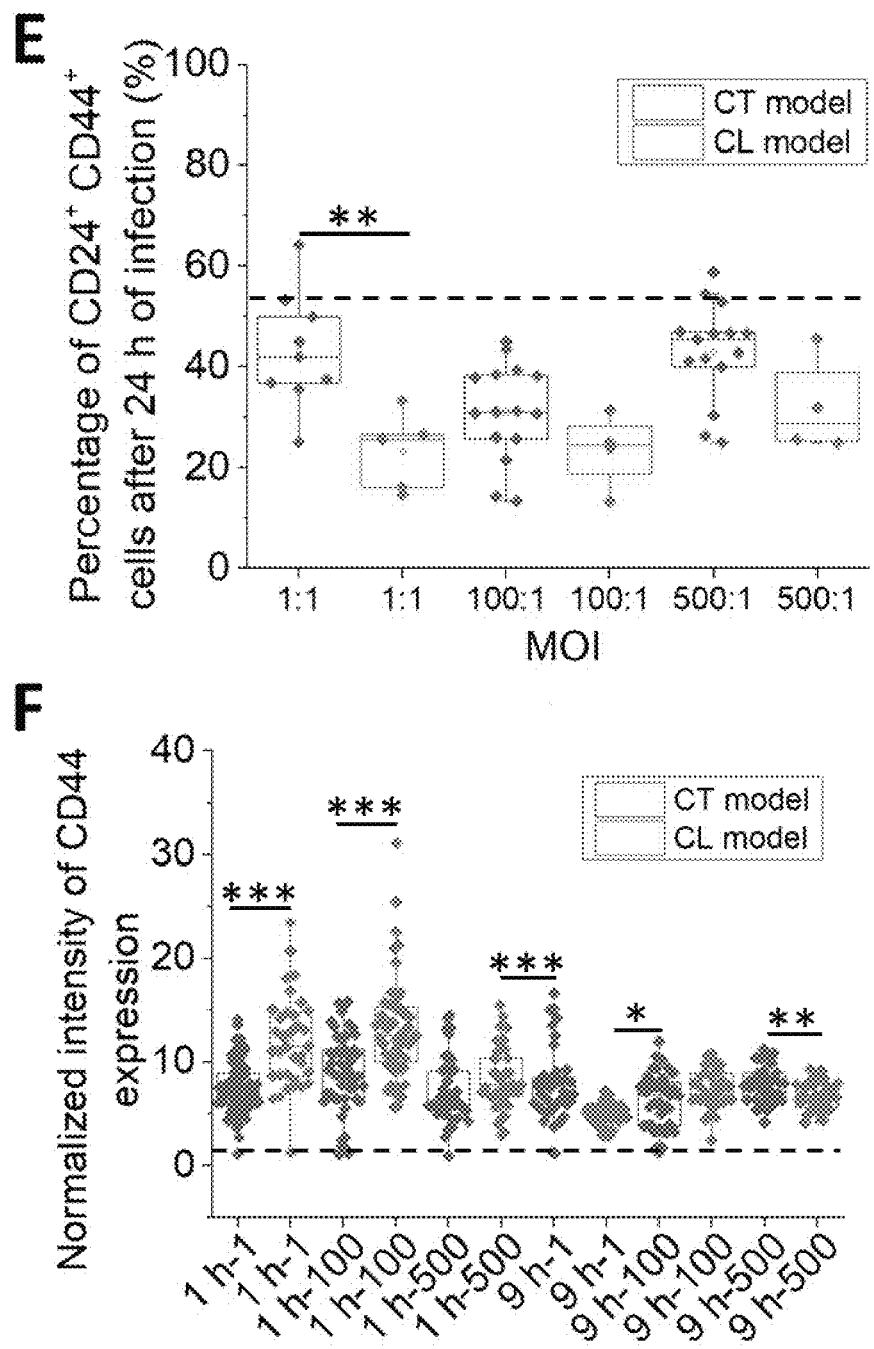

FIG. 10 The presence of biofilm increased the expression level of CSC markers. (A) Representative images of clusters stained with Hoechst (blue), CD24 (green), and CD44 (red) for the CL model (top) and CT model (bottom), respectively. (B) The proportion of CD44+ cancer cells in the CT and CL models 9 h after infection. (C) The proportion of CD24+ CD44+ cancer cells in the clusters established under CT and CL models 1 h after infection. (D) The proportion of CD24+CD44+ cancer cells in the clusters established under CT and CL models 9 h after infection. (E) The proportion of CD24+CD44+ cancer cells in the clusters established under CT and CL models 24 h after infection. The dotted line indicates the proportion of CD24+CD44+ cells in the uninfected control group ($28.94 \pm 7.73\%$). (F) Intensities of CD44 expression in cancer cells from the CT model and CL model 1 h and 9 h after infection, respectively. Intensity values were normalized to that of the background. The dotted line indicates the intensity of CD44 expression of uninfected control ($1.50 \pm 0.33$). * states for p values of <0.001;  states for p values of <0.01, * states for p values of <0.05.

Figure 11:
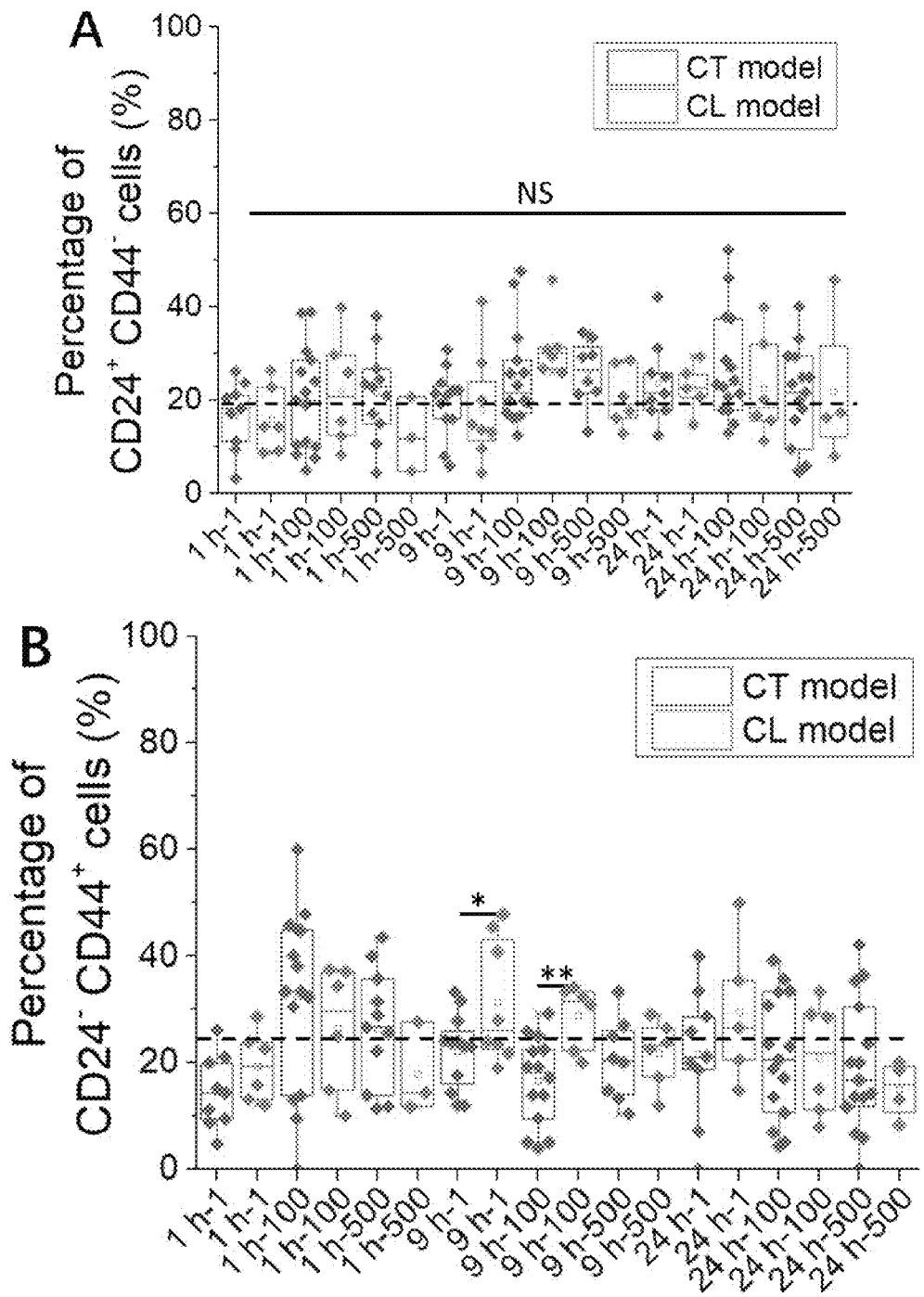
Figure 11:
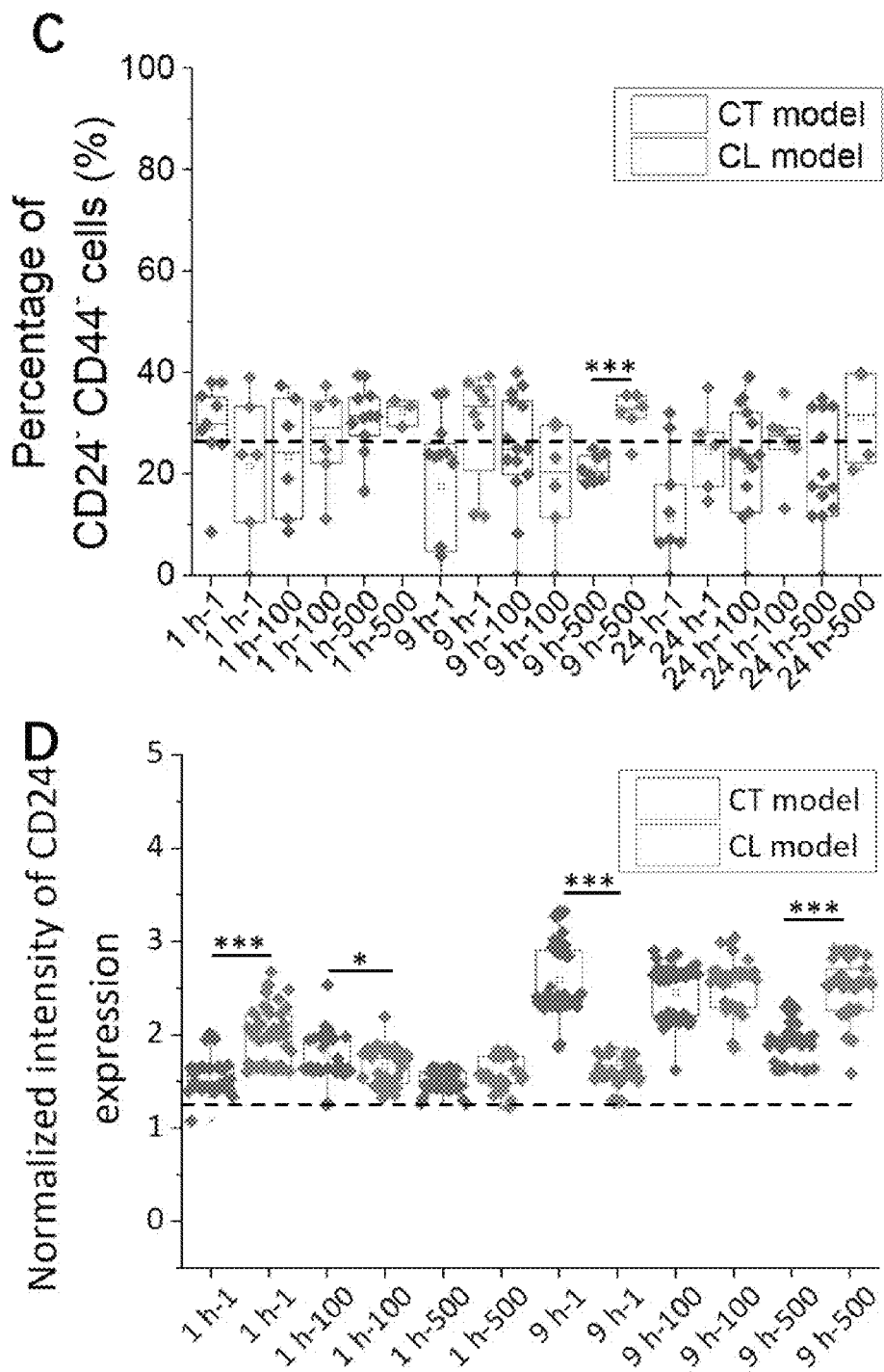

FIG. 11 (A) Comparison of the population of CD24+ CD44− cancer cells in clusters established under CT and CL models for 24 hours infection. The dotted line marked indicates the average percentage of CD24+CD44− cells from uninfected control ($19.06 \pm 9.48\%$). (B) Comparison of the population of CD24− CD44+ cancer cells in clusters established under CT and CL models for 24 h infection. The dotted line marked indicates the average CD24+CD44− percentage of uninfected control ($25.13 \pm 10.83\%$) (C) Comparison of the population of CD24+CD44− cancer cells in clusters established under CT and CL models for 24 hours infection. The dotted line marked indicates the average CD24− CD44+ percentage of uninfected control ($26.87 \pm 14.59\%$) (D) Comparison of the intensities normalized to background value of CD24 immunostaining signal between CT model and CL model after 1 h and 9 h infection, respectively. The dotted line marked indicated the average normalized intensity of the uninfected control groups ($1.29 \pm 0.22$) * states for p values of <0.001;  states for p values of <0.01, * states for p values of <0.05.

Figure 12:
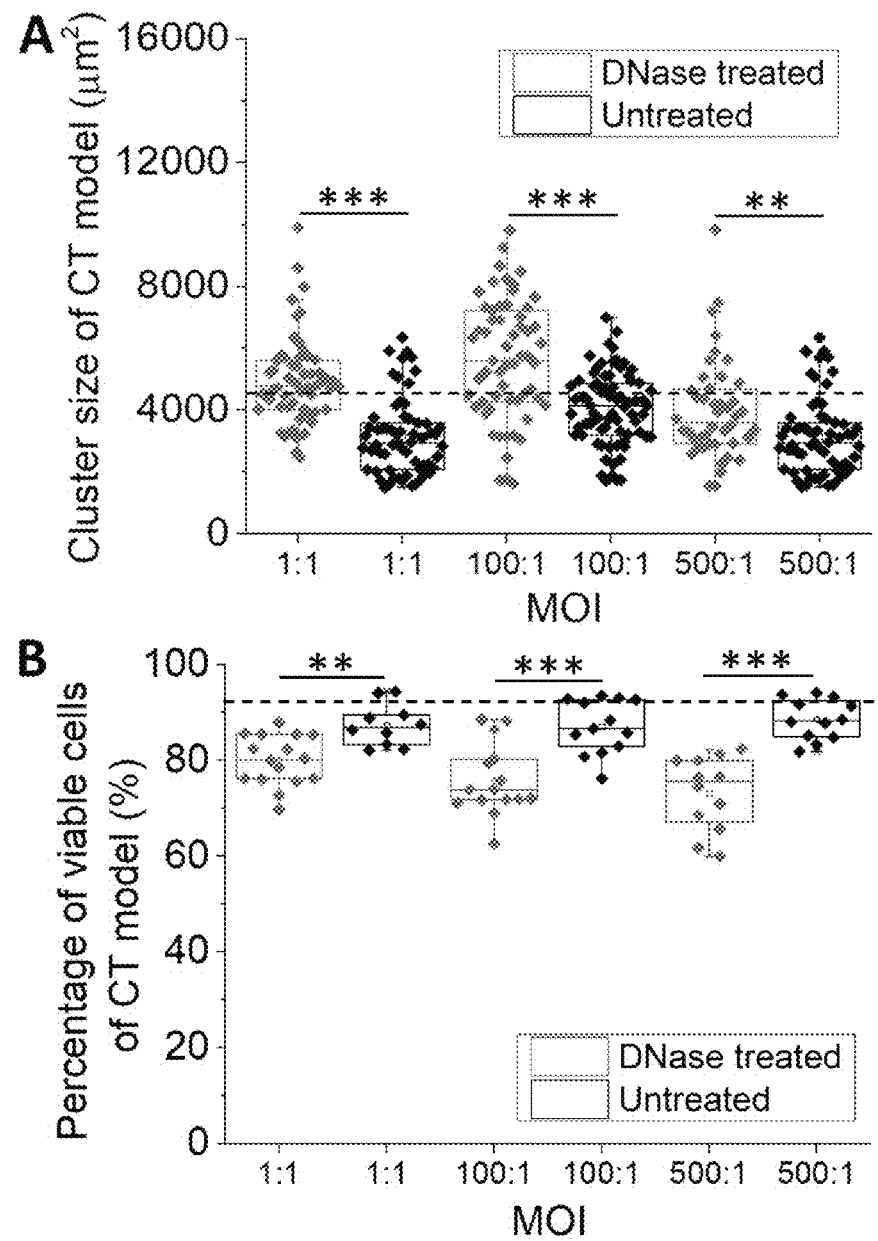
Figure 12:
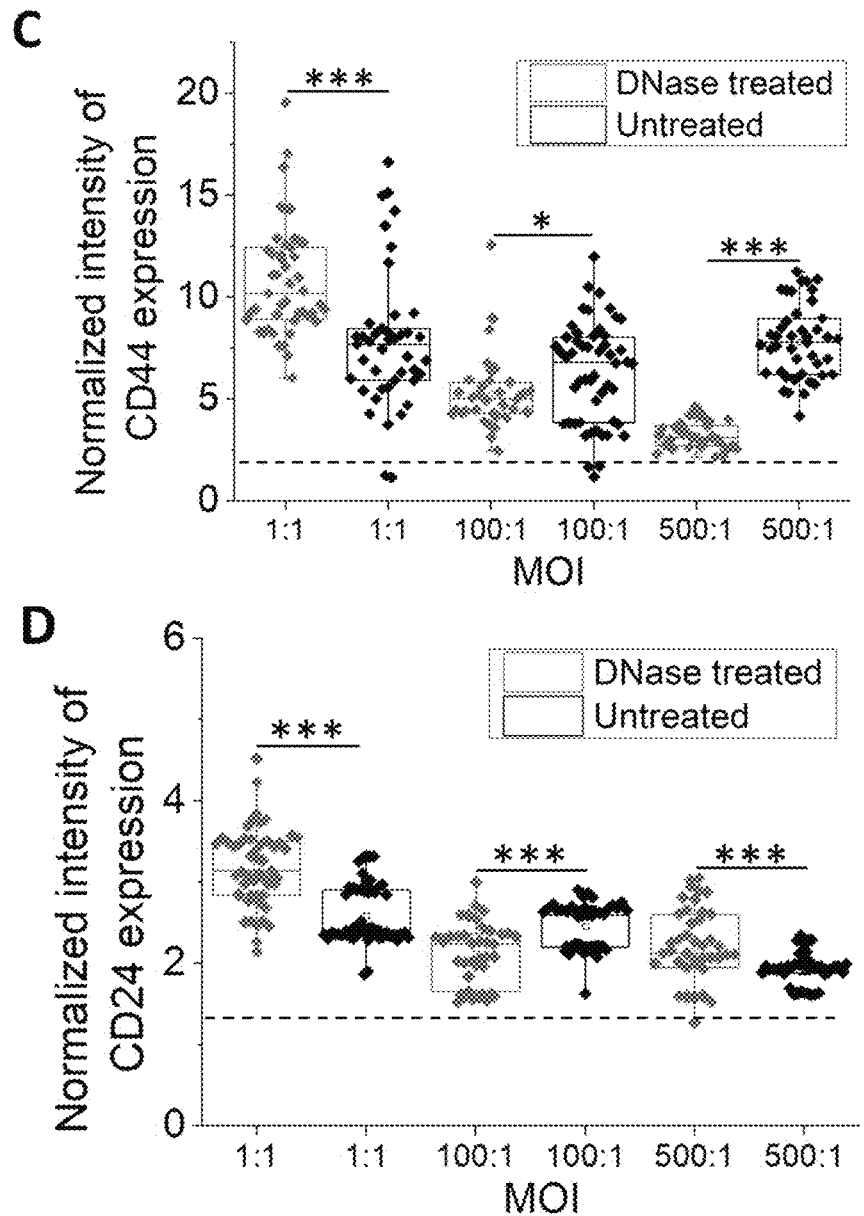

FIG. 12 DNase-induced biofilm disruption restores the phenotype produced by the presence of biofilm in the CT model. (A) Cluster size in CT models after DNase treatment to disrupt the biofilm. The dotted line represents the average cluster size of uninfected cancer cell clusters ($4319.10 \pm 2024.48$µ2). (B) Cell viability in CT models after DNase treatment to disrupt the biofilm. The dotted line represents the average viability of uninfected cancer cell clusters ($92.10 \pm 5.07\%$). (C) Normalized intensity of CD44 expression for cancer cells in clusters treated or untreated with DNase 9 h after infection, using the CT model. The dotted line represents the average CD44 intensity of the uninfected group (1.50±0.33). Data was normalized to background values. (D) Normalized intensity of CD24 expression for cancer cells in clusters treated or untreated with DNase 9 h after infection, using the CT model. The dotted line represents the average CD24 intensity of the uninfected group (1.29±0.22). Data was normalized to background values. * states for p values of <0.001;  states for p values of <0.01, * states for p values of <0.05.

Figure 13:
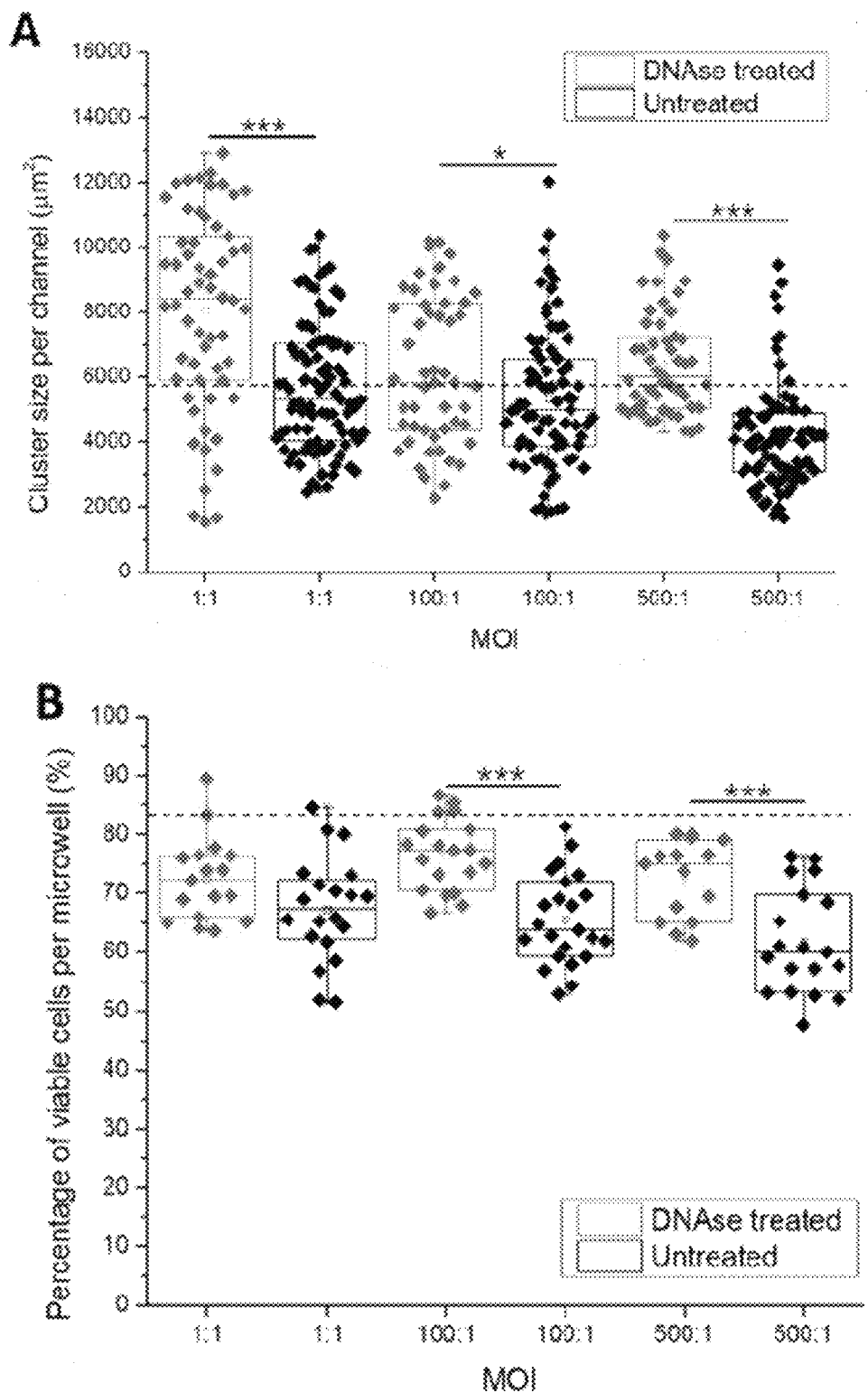
Figure 13:
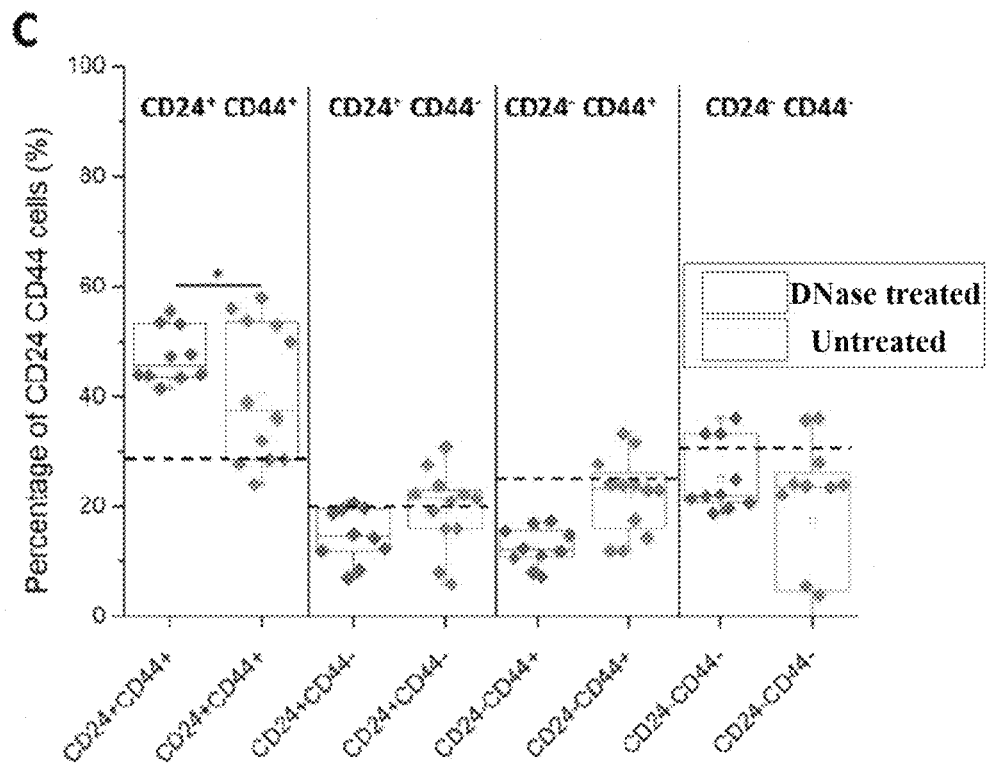
Figure 13:
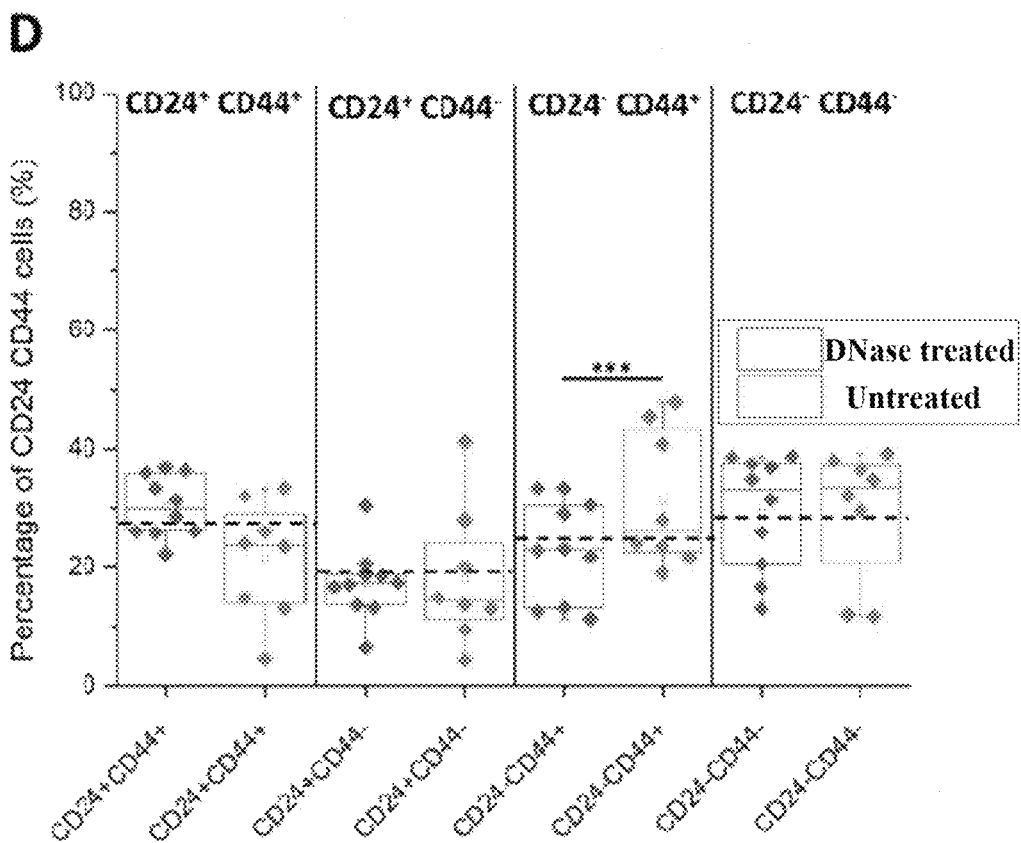
Figure 13:
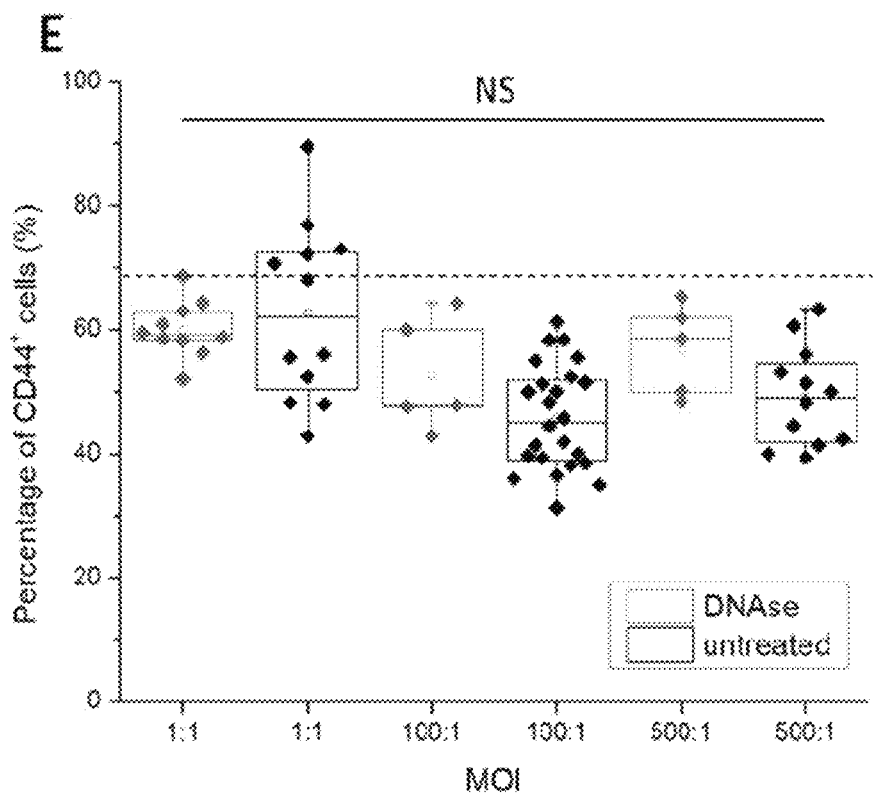
Figure 13:
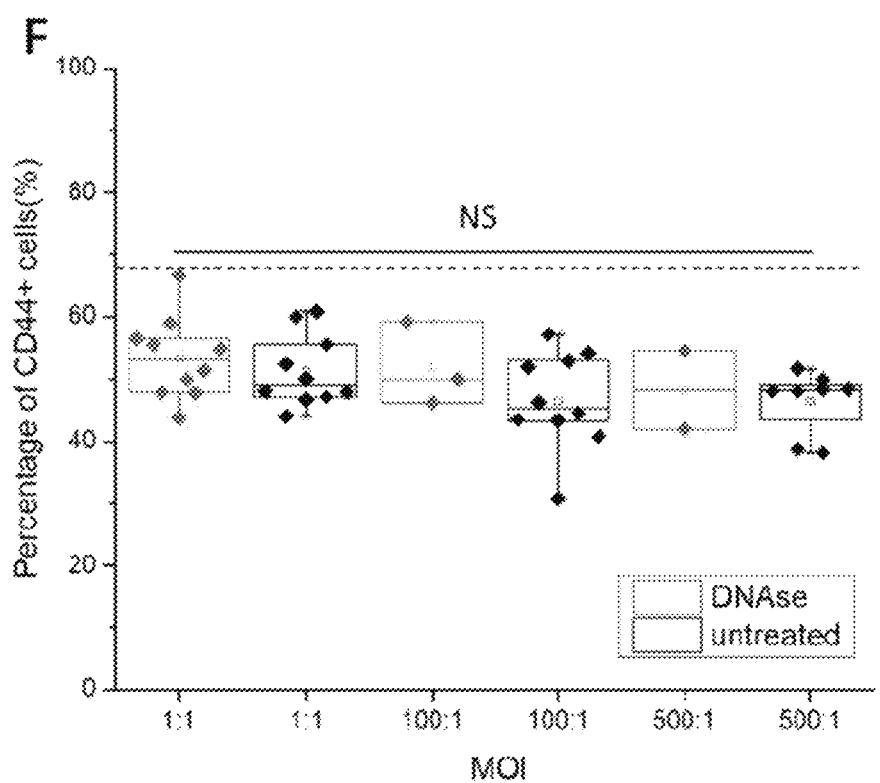

FIG. 13 (A) Cluster size per microwell after treated with DNase for 8 hours after 1 h infection to disperse biofilm and untreated group after 9 h infection of CL model. The dotted line indicates the average cluster size of cancer cell clusters without infection (5787.00±2431.28 µm$^2$). (B) Cell viability after treated with DNase for 8 hours after 1 h infection to disperse biofilm and untreated group after 9 h infection of the CT model. The dotted line marked is the average of the control groups without bacterial infection (84.69±5.61%). The population of CD24+CD44+/CD24+CD44−/CD24−CD44+/CD24− CD44− cells within DNase treated and untreated for 9 h infection at MOI 1:1 in the (C) CT model and (D) CL model. The dotted lines marked are the average percentages of the control groups without bacterial infection (CD24+CD44+: 28.94±7.73%, CD24+CD44−: 19.06±9.48%, CD24− CD44+: 25.13±11.18% CD24−CD44−: 31.62±11.68%). (E) Comparison of the population of CD44+ cells between DNase treated group and untreated group in (E) CT model and (F) CL model. The dotted line marked indicates the average CD44+ cell percentage of the uninfected group (67.62±5.67%). * states for p values of <0.001;  states for p values of <0.01, * states for p values of <0.05.

Figure 14:
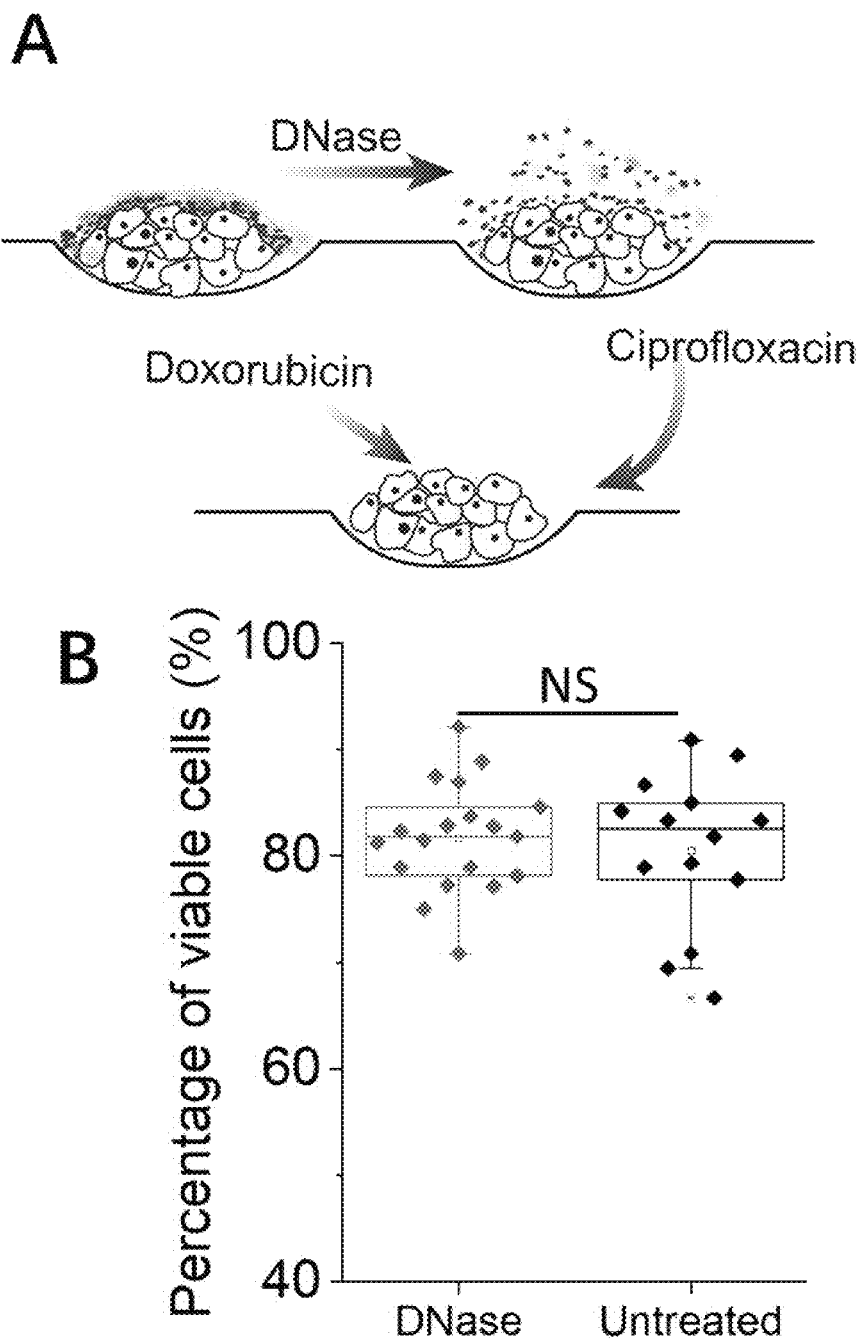
Figure 14:
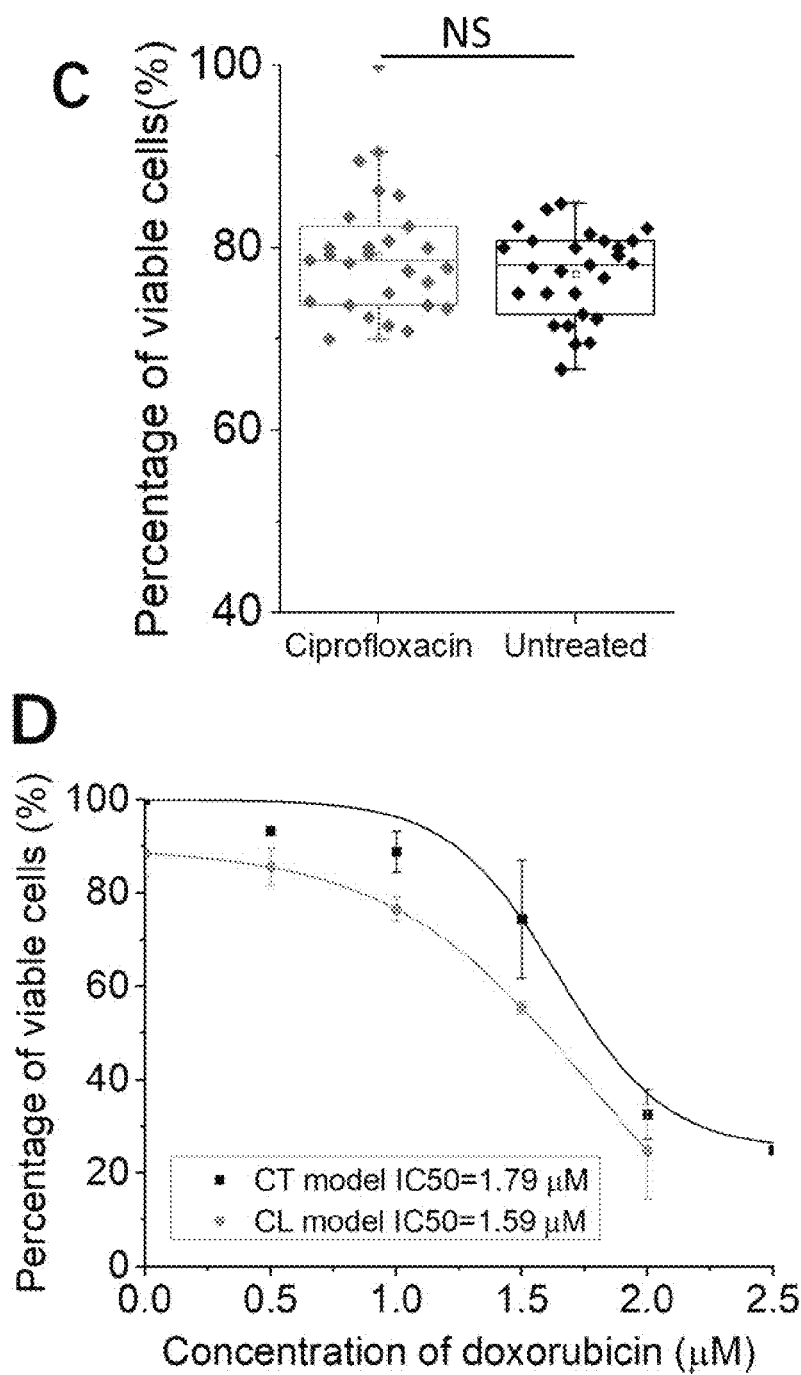
Figure 14:
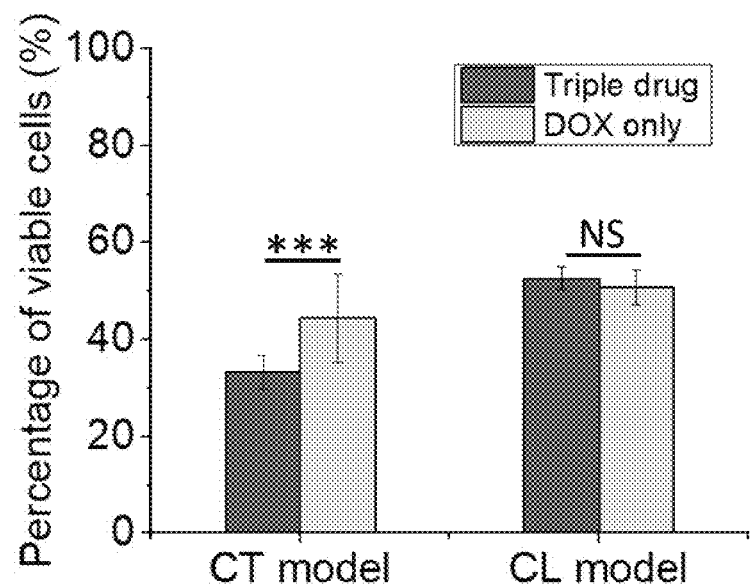
Figure 14:
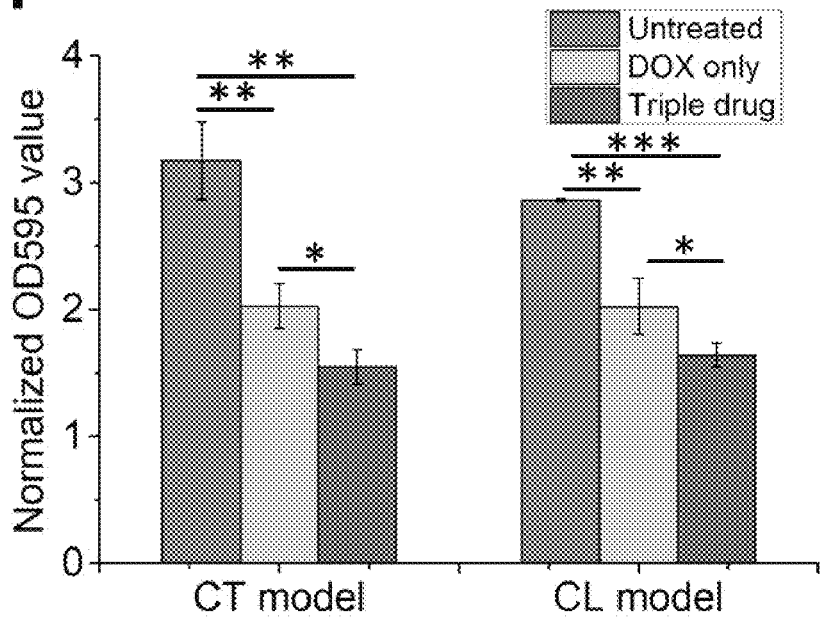

FIG. 14 The triple-drug combinational treatment effectively eradicated anti-cancer drug resistance induced by the presence of bacterial biofilms. (A) Schematics demonstrating the combined efficacy of the triple-drug combinatorial treatment. DNase was used as the antibiofilm agent, Cipro as the antibacterial agent, and doxorubicin as the anti-cancer drug to completely eradicate biofilms. (B) The viability of cancer cells in the uninfected control group before and after DNase treatment. (C) The viability of cancer cells before and after Cipro treatment for 24 h (MIC value: 0.025 m/mL). NS=not significant. (D) Dose-response curves of doxorubicin for cancer cells with the CT model and the CL model at MOI 1:1. The IC50 values of doxorubicin for the CT model and the CL model were 1.79 µM and 1.59 µM, respectively. (E) The viability of cancer cells after triple-drug combinational treatment at MOI 1:1 for 72 h (Cipro (0.025 µg/mL), 1×DNase, and doxorubicin (at IC50 values) with the CT model and CL models, respectively. IC50 values of doxorubicin on cancer cells from the CT and CL models were 1.79 µM and 1.59 µM, respectively. (F) The OD595 values of solubilized CV from CT and CL models after DOX treatment (at IC50 value) and triple-drug treatment at MOI 1:1 for 72 h (Cipro (0.025 µg/mL), 1×DNase, and doxorubicin (at IC50 value). The untreated groups infected with UTI89 at MOI 1:1 for 72 h in both models were set as controls. * states for p values of <0.001;  states for p values of <0.01, * states for p values of <0.05; NS=not significant.

DETAILED DESCRIPTION OF THE PRESENT INVENTION

Figure 1A:
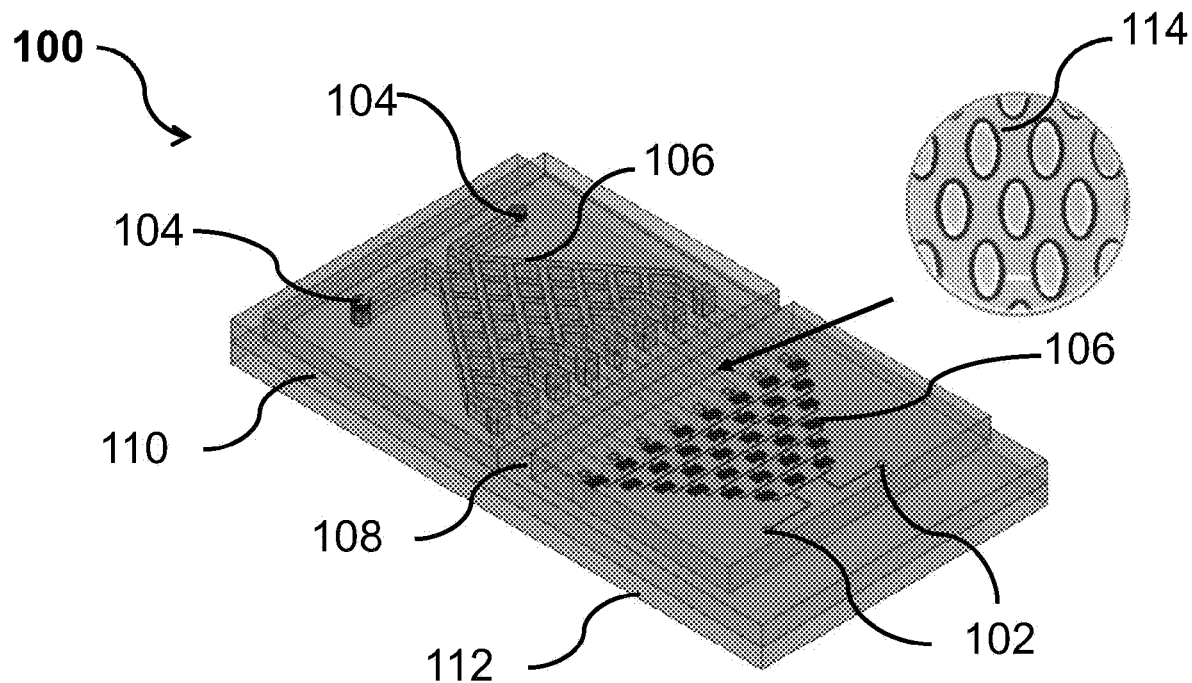
FIG. 1A shows a perspective view of a microfluidic device for preparing a cell model, according to an example embodiment.

FIG. 1A shows a perspective view of a microfluidic device 100 for preparing a cell model, according to an example embodiment. The cell model may include a cell culture surface with a plurality of micropores dimensioned to confine cancer or tumour-associated cells with pathogens to obtain a complex three-dimensional inflammatory model to investigate cell interactions under well-defined conditions. The microfluidic device 100 includes a housing having at least three layers, a first inlet area 102 at a top layer and at one end of the housing for receiving a first mixture comprising cells and a second inlet area 104 at the top layer and at an opposite end of the housing for receiving a second mixture containing one or more agents or one or more pathogens. Each of the first and second inlet areas (102, 104) has at least two inlet ports (not shown in the Figure). The first mixture may include but is not limited to cells selected from the group consisting of cancer cells, tumor cells, mesenchymal cells, epithelial cells, cancer stem cells, immune cells, tumour-associated cells, and any combination thereof. For example, the cancer cells can be colon cancer cells, bladder cancer cells, breast cancer cells, prostate cancer cells, ovarian cancer cells, cervix cancer cells, squamous cancer cells, lung cancer cells, pancreatic cancer cells, stomach cancer cells, kidney cancer cells or liver cancer cells. Other types of carcinoma cells may include head and neck and rectum cancer cells. The tumor-associated cells may be fibroblasts, tumour-associated macrophages, natural killer cells, circulating endothelial stem cells, or progenitor cells.

The first mixture may further include a first pathogen. The first pathogen of the first mixture may be selected from the group consisting of a bacterium (such as a non-colonizing bacterium, a colonizing bacterium), a virus, a fungus, an algae, a protozoan, and other microorganism; the one or more pathogens of the second mixture may be selected from the group consisting of one or more bacteria (such as a non-colonizing bacterium, a colonizing bacterium), one or more viruses, one or more fungi, one or more algae, one or more protozoan, and other microorganisms; in some cases, the first pathogen is a bacterium and the one or more pathogens are one or more bacteria. The one or more agents of the second mixture may be selected from the group consisting of one or more antimicrobial agents, one or more antibiotics, one or more biofilm dispersal agents, one or more anti-cancer drugs, and a combination thereof.

The device 100 also includes a plurality of microchannels 106 through which the first mixture and/or the second mixture flows into the corresponding wells 108. Each microchannel 106 has an end in fluid communication with the first inlet area 102, and another end in fluid communication with the second inlet area 104. Each of the first inlet area 102 and the second inlet area 104 may include a gradient region configured to load the microchannels 106 with different concentrations of the first mixture and/or the second mixture. For example, the gradient region can be configured as a tree-like gradient generator. It can be appreciated other types of gradient generator are possible. Each of the microchannels 106 is in fluid communication with at least two wells 108 for retaining cells. In one example, each of the wells 108 has a depth of at least 150 micro-meters (µm).

As shown in FIG. 1A, the device 100 includes three layers, with the first and second inlet areas (102, 104) at the top layer for receiving a first mixture of bacteria and culture as described above. A middle barrier layer 110 forms a plurality of channels and the bottom layer 112 may contain an array of tapered microwells 114 utilized for the formation of cell clusters.

Figure 1B:
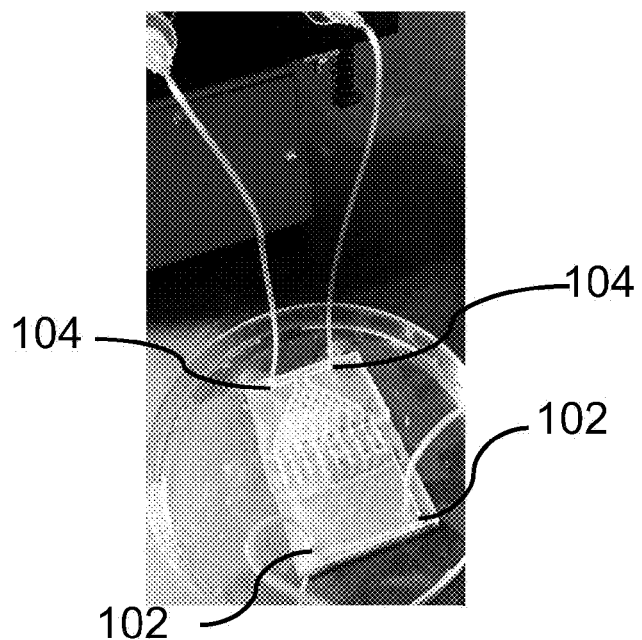
FIG. 1B shows a top view of the microfluidic device of FIG. 1A, according to an example embodiment.

FIG. 1B shows a top view of an image of the microfluidic device of FIG. 1A, according to an example embodiment. In FIG. 1B, two inlet areas (102, 104) allow parallel inflow of bacteria and culture medium.

The first mixture and/or the second mixture flowing into the corresponding wells 108 at the top layer may form a pathogen-cancer cell co-culture substrate for establishing an inflammatory model with cancer cells or tumor-associated cells. The substrate may be adapted to fit within the microfluidic device 100, which can be a cell culture vessel.

The substrate may be connected to a second substrate (not shown in in Figure) that allows the introduction of fluids, such as antimicrobials, antibiotics, anti-pathogenic agents, biofilm dispersal agents, anti-cancer drugs, or multiple agents in combination, to generate gradients for high throughput screening in parallel. A third substrate (not shown in in Figure) may be connected, allowing the introduction of components, such as bacteria, after establishing cell cultures.

In an embodiment, an integrated system for testing agents with activity toward cancer cells and pathogens is disclosed. The system may include the device 100 and consists of three layers: the first substrate layer, including tapered microwells for the formation of cell clusters; a second substrate in the middle led to enclosed channels comprising the cell culture may be bonded with the first substrate layer; the first and second substrate layers may be in contact with a third substrate layer having at least two inlets to introduce fluids containing one or more agents to be tested for concentration gradient generation. The other side of the first and the second substrate layers may further be in contact with a fourth substrate layer with at least two inlets having a network to deliver one or more cell components to test the effect of the components on cancer cells contained within the cell culture substrate. The liquid waste can be directly removed by the device 100 through manual pipetting or through one or more of the inlets with a one-directional flow.

The microfluidic device 100 can be formed as described in the following paragraphs. The device 100 can be formed with three polydimethylsiloxane (PDMS) layers. Each layer may be obtained from a master mold produced by three-dimensional printing or standard photolithography, and the PDMS layers can be permanently bonded by oxygen plasma surface activation for assembly. The performance stability of the gradient generator can be determined by the visualization of food dyes. The input flow rates of the top gradient generator and the bottom bacterial distributor can both be set to 100 µL/min.

The master mold of the tapered microwell layer and the gradient generator for the culture media inlet can be made through diffuser back-side lithography procedures. The mold may be hard-baked at 150° C. for five minutes for PDMS molding. A replica PDMS mold can be made via doublecasting as the working mold for further manufacturing processing to protect the micropatterns on a silicon wafer. PDMS may be prepared using the Sylgard 184 Silicone Elastomer Kit (Dow Corning) via a thorough mixing of the base resin and curing agent in a weight ratio of 10:1. After demolding from the master mold, the first PDMS replica is the mold with recessed patterns. After plasma treatment for two minutes using plasma cleaner (high RF level, 700 mmtor) this replica may be immediately exposed to vapours of trichloro (1H,1H,2H,2H-perfluorooctyl) silane (Sigma-Aldrich, cat no 448931) in a vacuum desiccator for at least six hours The second PDMS mold can be fabricated by the same procedure described above. The barrier layer, which defines the 32 microchannel regions and the gradient generator with a wider channel for bacteria inlet, can be fabricated using polylactic acid (PLA) molds by three-dimensional printing. Three layers (bottom: microwell layer, middle: microchannel layer, top: gradient generator layers) may be assembled by plasma-treated for five minutes (high RF level, 700 mmtor), and baked for two hours at 70° C.

The PIEB microfluidic device 100 based on microwells as described herein may provide a reliable design that can obtain comparative results from samples obtained under different processing conditions. The molds for each layer are produced using different strategies to suit the respective geometric shapes, dimensions, and tolerances of the respective features. The device can have robust performance through even the distribution of cell and bacteria components. Only a small number of samples are needed to establish microclusters due to the integration of microfluidics. This can provide possibilities for applications related to rare primary cancer cells. The operation of the device can be straightforward, and fabrication may be cost-effective. This may provide potential utility for patient clinical samples (such as the patients' tumor microbiome and circulating tumor cell culture), which had previously been reported to reflect the patient's prognosis. Accordingly, the development of this assay can facilitate rapid, high-throughput, and inexpensive assessments of drug response to guide the development of drug discovery and treatment options for personalized treatments.

The device 100 may also be easy to operate as the platform can be easily controlled by users who have basic training on key equipment such as syringe pumps. The device can also have high throughput and can access 32 sample conditions in parallel through multiplexing of the device. A greater degree of multiplexing can be achieved (up to 96 samples per run) using appropriate settings, for example, having an external casing.

The device can also have a wide scope of application. This is due to the confined cell interactions generated by the cell culture substrate; the protocol does not require specific growth factors that can be applied to various types of cancer and bacteria samples, including patient-derived liquid biopsy, tumor biopsy, or primary tumor specimens.

There are various methods of using the microfluidic device as disclosed herein.

According to the invention as disclosed herein, there is provided a method for establishing a cell model for a disease, comprising: providing a microfluidic device as described herein; adding cells to the microfluidic device; and culturing said cells in the microfluidic device to establish the cell model.

Various types of cells may be used to establish the cell model. The cells may be cancer cells, non-cancer cells, or a combination thereof. In one example, the cells may be cancer cells. In another example, the cells may be non-cancer cells. In yet another example, the cells may be a combination of cancer cells and non-cancer cells.

In one embodiment, cancer cells may be used to establish the cell model. The cancer cells may be from any cancer type, for example, colon, bladder, prostate, leukemia, ovarian, cervix, head and neck, squamous, rectum, pancreatic, stomach, kidney, liver, lung, breast, and urothelial cancer cells.

The cancer cells may be either solid tumor cells or non-solid tumor cells.

In one example, the cancer cells are solid tumor cells. For example, the cancer cells may be, but not limited to, colon, bladder, breast, prostate, ovarian, cervix, head and neck, squamous, lung, rectum, pancreatic, stomach, kidney, liver, or urothelial cancer cells. In one example, the cancer cells may be colon, bladder, breast, prostate, ovarian, cervix, squamous, lung, pancreatic, stomach, kidney, or liver cancer cells. In one example, the cancer cells may be colon, lung, breast, or bladder cancer cells.

In another example, the cancer cells are non-solid tumor cells. For example, the cancer cells may be leukemia cells.

It would be appreciated that cancer cells of any cancer type cultured in the microfluidic device may be used in the method. Cancer cells of different metastatic potential may be used.

In another example, the non-cancer cells may be associated with cancers.

The cancer-associated cells may be, but are not limited to, epithelial cells, mesenchymal cells, cancer stem cells, blood cells, or a combination thereof. In one example, the cancer-associated cells may be epithelial cells.

The cancer cells may be, but are not limited to, immortalized cancer cell lines, primary cancer cells, circulating cancer cells, or cancer cells isolated from a patient-derived liquid biopsy, tumor biopsy, or primary tumor specimen. In one example, the cancer cells may be immortalized cancer cell lines. In another example, the cancer cells are primary cancer cells.

For example, the cancer cells may be UMUC-3 bladder cancer cells.

In another embodiment, non-cancer cells may be used to establish the cell model. The non-cancer cells may be, for example, white blood cells, lymphocytes, macrophages, epithelial cells, blood cells, or fibroblasts.

In one example, the non-cancer cells may not be associated with cancers.

In another example, the non-cancer cells may be associated with cancers.

In one example, the cancer-associated cells may be cancer-associated fibroblasts (CAFs), tumor-associated macrophages (TAMs), infiltrating neutrophils, red blood cells, T-cells, or white blood cells (WBCs). As core components of the tumor microenvironment (TME), cancer-associated cells have been shown to play a role in cancer. For example, neutrophils may be a potent enabler of proliferation, invasion, and angiogenesis within cancer cells.

In another example, the cancer-associated cells may be primary cells or cell lines. The primary cells may be directly isolated from a clinical biopsy sample.

In some examples, the cancer-associated cells may be added to the cancer cells for coculture at clinically relevant ratios and under well-defined conditions.

With the cancer cells, non-cancer cells, or a combination thereof, cell models for various diseases may be established.

In one embodiment, the method as disclosed may be used to establish a cell model for cancer. The cancer may be a solid tumor or a non-solid tumor.

The non-solid tumor may also be known as a liquid tumor. For example, the liquid tumor may be leukemia.

The solid tumor may be, but not limited to, colon, bladder, breast, prostate, ovarian, cervix, head and neck, squamous, lung, rectum, pancreatic, stomach, kidney, liver, or urothelial cancer. In one example, the solid tumor may be colon, bladder, breast, prostate, ovarian, cervix, squamous, lung, pancreatic, stomach, kidney, or liver cancer. In one example, the solid tumor may be colon, lung, breast, or bladder cancer.

In another embodiment, the method as disclosed may be used to establish a cell model for a non-cancer disease. The cell model for the non-cancer disease may be, for example, stem cell models, tissue/organ on chip models, or cardiac models.

In one example, the non-cancer disease may not be associated with cancer.

In another example, the non-cancer disease may be associated with cancer.

In yet another example, the cell model may be established for a disease that is not associated with solid tumors, for example, leukemia aggregates, cardiac/vessel tissue, embryoid bodies (stem cells), or organ tissue layers.

As disclosed herein, the method may further comprise adding a pathogen to the microfluidic device and culturing the pathogen with the cells as described herein.

The pathogen may be a bacterium, a virus, a fungus, an algae, a protozoan, or other microorganisms. In one example, the pathogen may be a bacterium, a virus, a fungus, or other microorganisms. In a preferred example, the pathogen may be a bacterium, a fungus, an algae, a protozoan, or other microorganisms. In a more preferred example, the pathogen may be a bacterium. The bacterium may be a gram-positive or gram-negative bacterium. For example, the pathogen may be a gram-negative bacterium. In some examples, bacteria associated with cancer may be used to establish cancer inflammatory models. In one example, the pathogen may be *Helicobacter pylori* for gastric or colorectal cancer, or *Escherichia coli* for colon or bladder cancer. In a more preferred example, the pathogen may be *Escherichia coli*. In one embodiment, the *Escherichia coli* may be a uropathogenic *Escherichia coli* (UPEC). For example, the pathogen is uropathogenic *Escherichia coli* (UPEC) UTI89.

In some examples, a biopsy sample may be used to establish a cell model. In one example, the biopsy sample may comprise both cells and a pathogen, such as a bacterium. Suitable examples of biopsy samples may include, but are not limited to, a patient-derived liquid biopsy, tumor biopsy, primary tumor specimen, patient clinical sample, and tumor microbiome. Primary cells may be directly isolated from a clinical biopsy. Primary cell lines may also be used. Bacterial strains may be directly isolated from a clinical biopsy, or obtained from clinical isolates.

Cell culture conditions may be provided to support the growth of the cells, or cells and pathogen. Cell culture conditions may include, but are not limited to, culture medium, temperature, $CO_2$ concentration, pH, and other parameters. It would be appreciated that a suitable culture medium may be determined according to the growth requirement of the cells and the pathogen. In some examples, growth factors are not required to be added in the culture medium. It would be appreciated that antimicrobials should not be added when establishing a cell model comprising a pathogen. In one embodiment, the culture medium is Minimum Essential Medium a (MEM a) or MEM a without antibiotics. In one example, the culture medium is MEM a without antibiotics. Co-culture of the cells and the bacteria may be established under standard culture conditions, for example, in an antibiotic-free cell growth medium, at 37° C. with 5% $CO_2$ in a humidified environment.

The pathogen and cells may be co-cultured under a range of multiplicity of infection (MOI). For example, a suitable MOI may be between about 1000:1 and about 0.01:1 inclusive. For example, the MOI may be about 1000:1, about 500:1, about 100:1, about 10:1, or about 1:1, or about 0.1:1, or about 0.01:1. In one embodiment, the bacteria and cancer cells are cultured under an MOI of about 500:1, about 100:1, or about 1:1. In one embodiment, the pathogen and cancer cells may be cultured at a high MOI, for example, about 100:1 or about 500:1. In another embodiment, the pathogen and the cells may be cultured at low MOI, for example, about 1:1. It would be appreciated that the MOI may be titrated and optimized.

By co-culturing the cells and the bacteria, cell models for various diseases involving microorganisms may be established.

In one embodiment, the diseases involving microorganisms are associated with cancer.

In another embodiment, the diseases involving microorganisms are not associated with cancer.

In one example, the disease may be chronic inflammation in diabetes, or pulmonary disease.

In another example, the disease may be an inflammatory disease. In some examples, the inflammatory disease may not be associated with cancer. In some examples, the inflammatory disease may be associated with cancer, such as microbial infection in a cancer patient.

The microbial infection may be an infection with a virus, a fungus, an algae, a protozoan, or other microorganisms. In one example, the microbial infection may be an infection with a virus, a fungus, or other microorganisms.

In one example, the microbial infection may be a bacterial infection in a cancer patient. The cell model may be a pathogen-cancer inflammatory model.

Different cell models of microbial infections may be established. The pathogen may interact differently with the cancer cells in different cell models.

In an embodiment, the pathogen is added to the microfluidic device after the addition of the cells.

In a preferred embodiment, the cells form a cell cluster prior to the addition of the pathogen.

In one embodiment, the pathogen forms a biofilm. The biofilm may be formed on the surface of the cell cluster.

It would be appreciated that such cell models may be used to represent a coating model of microbial infection where pathogens are present on the surface of the cell cluster.

In some examples, when the cells are cancer cells, the pathogen may be present outside of the tumor or cancer cell cluster in the form of biofilm and may be referred to as extratumoral bacteria. For example, such pathogens may be non-colonizing bacteria. Such cell models may mimic biofilm-related chronic or acute bacterial inflammations in cancer patients or non-cancer patients with inflammatory disease.

In another embodiment, the cells and the pathogen are added to the microfluidic device concurrently. The cells and the pathogen may be mixed before being added to the microfluidic device.

In a preferred embodiment, the cells and the pathogen form a cluster comprising cells and pathogen.

It would be understood such cell models may be used to represent a colonizing model of microbial infection where pathogens infiltrate the cell cluster.

In some examples, when the cells are cancer cells, the pathogen may be present within or interspersed throughout the tumor or cancer cell cluster and may be referred to as intratumoral bacteria. For example, such pathogens may be colonizing bacteria. Such cell models may mimic the presence of colonizing bacteria within tumors. Such cell models may also mimic bacteria-based anti-cancer therapy.

It would be understood that the cell model enables the formation of a cell cluster or a cluster comprising cells and pathogen in three dimensions (3D), which is more representative of in vivo infection conditions as compared to the conventional models.

The cluster may be of different morphology, such as density and cluster size.

In one embodiment, the cluster may be of different densities, as reflected by normalized gray values between about 0.7 and about 0.9 inclusive. For example, the normalized gray values may be about 0.7, about 0.8, or about 0.9.

In another embodiment, the cluster may be of different sizes. For example, the cluster size may be between about 1500 $\mu m^2$ and about 15000 $\mu m^2$ inclusive. In one example, the cluster size mat be about 1500 $\mu m^2$, about 2000 $\mu m^2$, about 2500 $\mu m^2$, about 3000 $\mu m^2$, about 3500 $\mu m^2$, about 4000 $\mu m^2$, about 4500 $\mu m^2$, about 5000 $\mu m^2$, about 5500 $\mu m^2$, about 6000 $\mu m^2$, about 6500 $\mu m^2$, about 7000 $\mu m^2$, about 7500 $\mu m^2$, about 8000 $\mu m^2$, about 8500 $\mu m^2$, about 9000 $\mu m^2$, about 9500 $\mu m^2$, about 10000 $\mu m^2$, about 11000 $\mu m^2$, about 12000 $\mu m^2$, about 13000 $\mu m^2$, about 14000 $\mu m^2$, or about 15000 $\mu m^2$. In a preferred example, the cluster size may be about 1500 $\mu m^2$, about 3000 $\mu m^2$, about 6000 $\mu m^2$, about 10000 $\mu m^2$, or about 15000 $\mu m^2$.

As disclosed herein, the method may further comprises analyzing one or more effects of the pathogen on said cells, one or more interactions between the pathogen and said cells, or both. It would be appreciated that the cells models established by the disclosed method may be used to analyze the effects of the pathogen on the cells, and/or the interactions between the pathogen and the cells.

As disclosed herein, the PIEB microfluidic device utilized in the method can be applied as a biosensor to detect the presence of biofilms and to validate its role as a biomarker for inflammatory cancer, spectrometer-based detection assay for crystal violet (CV) stained biofilm biomass using both the defined inflammatory cancer models. In one embodiment, to signify presence of biofilm, the normalized OD595 value of CV-stained biomass should above 3.0. For example, the normalized OD595 value of stained biomass is about 3.0, about 3.1, about 3.2. The proposed CV spectrometer assays will guide clinicians in monitoring treatment efficacy and performing therapeutic intervention. Besides, clusters within the PIEB device were established within 24 h under optimal growth conditions, so those suitable therapeutic agents could be quickly screened and tested with a high throughput array.

The one or more effects of the pathogen on said cells may be any effect that the pathogen exerts on the cells that cause a change one or more characteristics of the cells. The one or more interactions between the cells and the pathogen may be any interaction between the cells and the pathogen that can cause a change in one or more characteristics in the cells and/or the pathogen. The one or more characteristics of the cells may include, but are not limited to, morphology, cell viability, proliferation, apoptosis, migration, EMT progression, metastatic potential, cancer cell stemness, differentiation, or a combination thereof. The morphology may include, but is not limited to, cell cluster size and density. The metastatic potential and cancer cell stemness may be measured by the expression of various biomarkers. The biomarkers for metastatic potential may include, but are not limited to, E-cadherin, Cytokeratin, N-cadherin, Snail, Vimentin, Twist-1, and ZEB1. The biomarkers for cancer cell stemness may include, but are not limited to, OCT4, SOX2, CD24, CD44, CD45, CD166, and CXCR. It would be understood that the cancer stemness may serve as the basis of cancer cell metastasis. In one example, the biomarkers for cancer cell stemness and metastatic potential are CD44 and CD24. The one or more characteristics of the pathogen may include, but are not limited to, pathogen proliferation, viability, the formation of biofilm, the secretion of virulence factors, or a combination thereof.

As disclosed herein, the cell models established by the disclosed methods may also be used to identify suitable agents and/or pathogens for disease treatment.

Therefore, the present invention also provides a method for identifying one or more agents or one or more pathogens for treatment of a disease, comprising: providing a microfluidic device as described herein; adding cells, or cells and a pathogen to the microfluidic device culturing said cells, or said cells and pathogen in the microfluidic device to establish a cell model; adding one or more agents or one or more pathogens to the cell model; monitoring one or more characteristics of said cells, pathogen, or both and comparing the one or more characteristics with a reference; and identifying the one or more agents or the one or more pathogens for treatment of the disease based on a change in the one or more characteristics relative to the reference.

The cell model may be established by adding cells only or a combination of cells and a pathogen.

In one embodiment, the cell model is established by adding cells only. The established cell model may represent cancer or non-cancer diseases.

In another embodiment, the cell model is established by adding both cells and a pathogen. The established cell model may represent a disease involving both cells and a pathogen.

One or more agents or one or more pathogens may be added for identifying suitable therapies for treating the disease. In one example, one or more agents are added for identifying suitable therapeutic agents. In another example, one or more pathogens are added for identifying suitable therapeutic pathogens.

The one or more agents or pathogens may be selected from the group consisting of one or more antimicrobial agents, one or more antibiotics, one or more biofilm dispersal agents, one or more anti-cancer drugs, one or more bacteria, one or more viruses, one or more funguses, one or more algae, one or more protozoa, one or more other microorganisms, one or more mall molecules or combinations thereof. In one example, the one or more agents or the one or more pathogens may be selected from the group consisting of one or more antimicrobial agents, one or more antibiotics, one or more biofilm dispersal agents, one or more anti-cancer drugs, one or more bacteria, one or more viruses, one or more funguses, one or more other microorganisms, one or more small molecules, or combinations thereof.

In one embodiment, the one or more agents may be one or more antimicrobial agents, one or more antibiotics, one or more biofilm dispersal agents, one or more anti-cancer drugs, or a combination thereof.

In one example, the one or more agents may be one or more antimicrobial agents. In one example, the one or more agents may be one or more biofilm dispersal agents. In one example, the one or more agents may be one or more anti-cancer drugs. In another example, the one or more agents may be one or more antimicrobial agents and one or more biofilm dispersal agents. In another example, the one or more agents may be one or more antimicrobial agents and one or more anti-cancer drugs. In another example, the one or more agents may be one or more antimicrobial agents and one or more anti-cancer drugs. In yet another example, the one or more agents may be one or more antimicrobial agents, one or more biofilm dispersal agents, and one or more anti-cancer drugs.

In some examples, the antimicrobial agents may be antibiotics. In one example, the one or more agents may be one or more antibiotics. In another example, the one or more agents may be one or more antibiotics and one or more biofilm dispersal agents. In another example, the one or more agents may be one or more antibiotics and one or more anti-cancer drugs. In yet another example, the one or more agents may be one or more one or more antibiotics, one or more biofilm dispersal agents, and one or more anti-cancer drugs.

In one embodiment, the biofilm dispersal agent comprises DNase.

The one or more agents may be identified as a monotherapy or a combinational therapy. The combinational therapy may be dual or triple therapy. For example, the combinational therapy may be a combination of an antibiotic and an anti-cancer drug, or a combination of an antibiotic, a biofilm dispersal agent and an anti-cancer drug. More than one agent from the same drug type may be used. For example, the combinational therapy may be a combination of multiple antibiotics, multiple biofilm dispersal agents, multiple anti-cancer drugs, or a combination thereof. Biofilm dispersal agents may also be known as anti-biofilm agents.

In one example, the one or more agents may be selected from agents with known therapeutic effects. For example, the one or more agents may be agents with known antibiotic, antimicrobial or anti-proliferative effects. In a preferred example, the antibiotics may be ciprofloxacin, gentamicin, tobramycin, or a combination thereof. In another preferred example, the anti-cancer drugs may be doxorubicin, etoposide, or both. In yet another preferred example, the biofilm dispersal agents may be DNase, Proteinase K, antibiofilm peptides, or a combination thereof.

In another example, the one or more agents may be agents with unknown therapeutic effects, agents with therapeutic effects not previously known, or agents associated with a given condition or disease. For example, the one or more agents may be a compound or a small molecule from a library. As such, the method may be used to identify novel therapeutic agents.

In one embodiment, the one or more pathogens may be bacteria, viruses, funguses, algae, protozoa, other microorganisms, or a combination thereof. In one example, the one or more pathogens may be bacteria, viruses, funguses, other microorganisms, or a combination thereof.

The one or more characteristics of the cells to be monitored may be, but are not limited to, morphology, cell viability, proliferation, apoptosis, migration, EMT progression, metastatic potential, cancer cell stemness, differentiation, or a combination thereof. The morphology may include, but is not limited to, cell cluster size and density. The metastatic potential and cancer cell stemness may be measured by the expression of various biomarkers. The biomarkers for metastatic potential may include, but are not limited to, E-cadherin, Cytokeratin, N-cadherin, Snail, Vimentin, Twist-1, and ZEB1. The biomarkers for cancer cell stemness may include, but are not limited to, OCT4, SOX2, CD24, CD44, CD45, CD166, and CXCR. It would be understood that the cancer stemness may serve as the basis of cancer cell metastasis. In one example, the biomarkers for cancer cell stemness and metastatic potential are CD44 and CD24.

The one or more characteristics of the pathogen to be monitored may include, but are not limited to, pathogen proliferation, viability, the formation of biofilm, the secretion of virulence factors, or a combination thereof.

The one or more characteristics may be measured by staining and microscopic imaging, such as optical, fluorescent, and confocal imaging. The staining may be carried out with antibodies or dyes. In one example, antibodies are used to measure the expression of biomarkers. In another example, dyes are used to detect the pathogen or biofilm. Examples of suitable dyes may include crystal violet and Congo red. In another example, the pathogen or biofilm may be detected by measuring markers such as biofilm matrix components and cyclic-di-GMP. The biofilm matrix components may be, for example, exopolysaccharides, adhesion proteins, cyclic-di-GMP, amyloids, curli, or extracellular DNA.

Other common methods may also be used to measure gene expressions, such as FACS and qPCR.

In one example, the one or more characteristics are measured in situ. For example, the measurement may be carried out in situ by optical imaging, fluorescent imaging, or confocal microscopy.

The one or more characteristics of the cells and the pathogen may be monitored for a short term or a long term. A short-term timepoint may be between about 1 hour and about 9 hours inclusive. For example, the short-term timepoint may be about 1 hour, about 6 hours, or about 9 hours. A long-term time point may be between about 9 hours and 72 hours inclusive. For example, the long-term time point may be about 12 hours, or about 24 hours, or about 48 hours, or about 72 hours. The long-term time point may be beyond about 24 hours. In one example, the one or more characteristics of the cells and the pathogen may be measured at about 1 hour, about 9 hours, or about 24 hours.

In one example, measurements may be taken continually at multiple timepoints.

A change in the one or more characteristics may be measured relative to a reference. The reference may be a cell cluster or a cluster comprising cells and pathogen that is provided in a similar cell model without adding the one or more agents or pathogens. In one example, the reference may be a cell cluster that is not infected or co-cultured with the pathogen, i.e., uninfected cells or uninfected cell clusters. In another example, the reference may be a cell and pathogen cluster without co-culturing with the one or more agents. In one example, the reference may be untreated cells, untreated cell clusters, untreated clusters comprising cells and pathogen, or untreated pathogen.

In one embodiment, the disease is cancer, or a disease associated with cancer, or both, and the cells are cancer cells or cancer-associated cells.

The method as described herein may be used to identify a pathogen for the treatment of cancer, wherein the cell model comprises cancer cells, one or more pathogens are added to the cell model, the one or more characteristics of the cancer cells are monitored and compared with a reference, and the one or more pathogens are identified for treatment of cancer based on a change in the one or more characteristics relative to the reference. The cell model may further comprise non-cancer cells.

The reference may be a cancer cell cluster that is provided by a similar cell model but not co-cultured with the one or more pathogens. The one or more pathogens may be identified as an anti-cancer therapy if the change relative to the reference is associated with cancer inhibition. The one or more pathogens may not be identified as an anti-cancer therapy if the change is associated with cancer progression. It would be understood that cancer inhibition and cancer progression may be determined by the change in the characteristics related to cancer inhibition and cancer progression. For example, a change related to cancer progression may increase cell proliferation, viability, metastatic potential, and/or cancer stemness relative to the reference. For example, a change related to cancer inhibition may be a decrease in cell proliferation, viability, metastatic potential, and/or cancer stemness relative to the reference. For example, if a decrease in cell proliferation is detected relative to the reference, the one or more pathogens may be identified as an anti-cancer therapy.

The method as described herein may also be used to identify one or more agents for the treatment of cancer and/or a microbial infection associated with cancer, wherein the cell model comprises cancer cells and a pathogen, one or more agents are added to the cell model, the one or more characteristics of the cancer cells and/or pathogen are monitored and compared with a reference, and the one or more agents are identified for treatment of cancer and/or the microbial infection associated with cancer. The cell model may further comprise non-cancer cells.

In one example, the method is used to identify one or more agents for the treatment of cancer.

In one example, the method is used to identify one or more agents for the treatment of a microbial infection associated with cancer, such as microbial infection in a cancer patient.

In another example, the method is used to identify one or more agents for the treatment of cancer and a microbial infection associated with cancer.

It would be appreciated that the disclosed method may be used to screen one or more drugs or compounds. For example, the method may be used to screen a library of compounds.

In a preferred example, the microbial infection is a bacterial infection.

According to the disclosure, the one or more agents or the one or more pathogens identified in the disclosed methods may be used to treat a disease. Therefore, the present invention further provides a method for treating a disease in a subject in need thereof, comprising administering the one or more agents or the one or more pathogens identified herein to the subject.

In one example, the one or more agents or the one or more pathogens may be used to treat cancer and/or a disease associated with cancer. In one example, the disease associated with cancer is a microbial infection in a cancer patient, for example, a bacterial infection. In one example, the one or more agents may be used to treat cancer and bacterial infection. In another example, the one or more pathogens may be used to treat cancer.

According to the disclosure, the present invention further provides a method for predicting a response to a therapy in a subject in need thereof, wherein the therapy is administration of one or more agents or one or more pathogens, comprising: providing the microfluidic device as described herein, adding a sample obtained from the subject to the microfluidic device, wherein the sample comprises cells, or cells and a pathogen; culturing said cells, or said cells and pathogen in the microfluidic device to establish a cell model; adding one or more agents or one or more pathogens to the cell model; monitoring one or more characteristics of said cells, pathogen, or both and comparing the one or more characteristics with a reference; predicting the response based on a change in the one or more characteristics relative to the reference.

The sample obtained from the subject may be, for example, a biopsy, a patient clinical sample, tumor microbiome, clinical bacterial isolations, circulating cancer cells, a patient-derived liquid biopsy, tumor biopsy, or primary tumor specimen.

The cell model established by adding the sample may closely represent the disease status and characteristics in the subject.

In one embodiment, the cell model is established by adding a sample comprising cells only. The established cell model may represent cancer or non-cancer diseases in the subject.

In another embodiment, the cell model is established by adding a sample comprising both cells and a pathogen. The established cell model may represent a disease involving both cells and a pathogen in the subject.

The therapy may be one or more agents or one or more pathogens selected from the group consisting of one or more antimicrobial agents, one or more antibiotics, one or more biofilm dispersal agents, one or more anti-cancer drugs, one or more bacteria, one or more viruses, one or more funguses, one or more algae, one or more protozoa, one or more other microorganisms, one or more mall molecules or combinations thereof. In one example, the one or more agents or the one or more pathogens may be selected from the group consisting of one or more antimicrobial agents, one or more antibiotics, one or more biofilm dispersal agents, one or more anti-cancer drugs, one or more bacteria, one or more viruses, one or more funguses, one or more other microorganisms, one or more small molecules, or combinations thereof.

The response to the therapy may be predicted based on a change in the one or more characteristics of the cells and/or pathogen relative to the reference. In one example, the reference may be the cells and/or pathogen that are obtained from the subject but not treated with the therapy. In another example, the reference may be the cells and/or pathogen that are obtained from the subject and treated with a control therapy, wherein the response to the control therapy is known in the subject. In yet another example, the reference may be cells and/or a pathogen that are obtained from a control subject and treated with the therapy, wherein the response to the therapy is known in the control subject.

A good response to the therapy, or good prognosis may be predicted if the change relative to the reference is associated with an improvement of the disease condition. A poor response to the therapy, or poor prognosis may be predicted if the change relative to the reference is associated with a deterioration of the disease condition. It would be appreciated that the disease condition may be determined by measuring the one or more characteristics of the cells and/or pathogen.

The method as disclosed herein may be used to guide the medical intervention, especially in personalized medicine, based on the predicted response to the therapy in the subject. For example, a therapy with a good predicted response may be selected for treating the disease in the subject.

The disclosed method may be used to predict a response to a combinational therapy in a subject in need thereof, comprising: providing a microfluidic device as described herein; adding a sample obtained from the subject to the microfluidic device, wherein the sample comprises cells, or cells and a pathogen; culturing said cells, or said cells and pathogen in the microfluidic device to establish a cell model; detecting the presence of bacterial biofilm; adding a combinational therapy to the cell model; monitoring one or more characteristics of said cells, pathogen, or both and comparing the one or more characteristics with a reference; and predicting the response based on a change in the one or more characteristics relative to the reference.

In one embodiment, the sample comprises cells and said cells are cultured to establish the cell model. In another embodiment, the sample comprises cells and a pathogen and said cells and pathogen are cultured to establish the cell model.

The presence of bacterial biofilm may be detected by various assays. In one example, the bacterial biofilm may be detected by crystal violate staining. The crystal violet staining may be measured by spectrometer-based detection assay. In one example, the presence of bacterial biofilm is detected by a crystal violet spectrometer-based assay. The presence of biofilm may be signified by a normalized absorbance value. In one example, the presence of biofilm may be signified by a normalized OD595 value of crystal violet-stained biomass above 3.0. For example, the normalized OD595 value of stained biomass is about 3.0, about 3.1, or about 3.2.

The bacterial biofilm may be used as a biomarker for inflammatory diseases, such as inflammatory cancer. Therefore, the biofilm detection assays, such as a spectrometer-based detection assay for crystal violet staining, may be used to validate the role of the biofilm as a biomarker for inflammatory diseases. The PIEB microfluidic device as disclosed may be applied as a biosensor to detect the presence of biofilm and to validate its role as a biomarker for inflammatory diseases.

The crystal violet spectrometer assays can be used to guide clinicians in monitoring treatment efficacy and performing therapeutic intervention.

The combinational therapy may be a combinational therapy selected from one or more anti-microbial agents, one or more antibiotics, one or more biofilm dispersal agents, one or more anti-cancer drugs, and a combination thereof. The combinational therapy may be a dual or triple therapy. In a preferred example, the combinational therapy is a triple therapy. For example, the triple therapy may comprise an antibiotic, a biofilm dispersal agent, and an anti-cancer drug. In one example, the antibiotic is ciprofloxacin, the biofilm dispersal agent is DNase, and the anti-cancer drug is doxorubicin.

The subject in need thereof may be suffering from various diseases as described. In one example, the subject in need thereof is suffering from inflammatory cancer. In one example, the subject in need thereof is a cancer patient suffering from systemic bacterial infections. In another example, the subject in need thereof requires cancer treatment of systemic bacterial infections within biofilms.

Clusters within the PIEB microfluidic device may be established within a short period, for example, within 24 h. As such, suitable therapeutic agents could be quickly screened and tested with a high throughput array using the PIEB microfluidic device.

In one embodiment, the method is used to predict a response to a triple drug combinational therapy in a subject suffering from inflammatory cancer, comprising: providing a microfluidic device as described herein; adding a sample obtained from the subject to the microfluidic device, wherein the sample comprises cells, or cells and a pathogen; culturing said cells, or said cells and pathogen in the microfluidic device to establish a cell model; detecting the presence of bacterial biofilm with crystal violet spectrometer-based assay and validating its role as a biomarker for inflammatory cancer; adding a triple drug combinational therapy to the cell model; monitoring one or more characteristics of said cells, pathogen, or both and comparing the one or more characteristics with a reference; and predicting the response based on a change in the one or more characteristics relative to the reference, wherein the triple drug combinational therapy is for cancer treatment of systemic bacterial infections within biofilms.

The invention illustratively described herein may suitably be practiced without any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation. There is no intention to use such terms and expressions of excluding any equivalents of the features shown and described or portions thereof. Still, it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also forms part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Non-limiting examples of the invention and comparative examples will be further described in greater detail by reference to specific Examples, which should not be construed as in any way limiting the scope of the invention.

Bacteria were discovered to colonize human tumors decades ago, but their impact on cancer is still poorly understood. Recent studies have shown that the disease state of cancer patients with bacterial infections may be affected, which suggests that extratumoral bacteria (EB) may affect tumor progression. Here, a microfluidic Platform was developed to analyze the effects of Intratumoral and Extratumoral Bacteria (PIEB) on the progression of bladder tumors under defined conditions. Compared with intratumoral bacteria (IB), tumor clusters became more compact over time only in the presence of EB. Exposure of tumor cells to IB reduced cell viability, but not in the presence of EB.

This was attributed to the formation of biofilms by EB, leading to higher cluster compactness and reduced virulence. The effect of DNase treatment to disperse biofilms restored the phenotype (cluster size and viability) of cancer cells in clusters co-cultured with EB to levels resembling clusters co-cultured with IB, indicating that the combination of biofilm disrupting agents in chemotherapy can potentially lead to beneficial effects. It is worth noting that when exposed to EB, the proportion of cancer stem cells (CSCs) expressing CD44 increased significantly, confirming the importance of eliminating infections in cancer patients for improving prognosis. The preclinical proof of concept will promote a better understanding of the effects of bacteria on tumor progression and tumor-pathogen interactions, and the PIEB model will facilitate further research on the role of antibiotics in cancer management.

The discovery of bacteria colonizing in human pancreatic tumor cells was made several years ago. However, detailed information about the impact of these interactions remains largely unknown. Bacterial infections have been shown to be related to the development of cancer, especially in the digestive system and urinary system, which can cause chronic inflammation or produce carcinogenic metabolites, leading to cancer-promoting effects (Table 1). Clinical evidence shows that *Escherichia coli* and *Clostridium nucleatum* have carcinogenic potential in patients with colorectal cancer, and *Helicobacter pylori* infection is highly correlated with the risk of gastric cancer and pancreatic cancer.

Table 1. Impact of inflammation on cancer development and progression. MMP=matrix metalloproteinase; ROMs=reactive oxygen metabolites.

| Type | Model | Bacteria | Cancer-promoting effects |
|---|---|---|---|
| Cell line and animal models | | | |
| Breast | MDA-MB-231 | *Staphylococcus aureus* (PGN-SA) | Promote invasiveness and adhesiveness of cells via activating TLR2 and then promoting NF-κB, STAT3 and Smad3 |
| Prostate | Epitherlial prostate ceil line RWPE-1 | *Propionibacterium acnes* | Induce inflammatory responses through plasminogen-MMP, COX2-prostaglandin pathways and IL-6-Stat3 pathways; Lead to the malignant transformation of RWPE-1 |
| Clinical studies | | | |
| Colon | NA | *F. nucleatum* | Promote angiogenesis; Recruits tumor-infiltrating immune cells |
| Gastric | NA | *Helicobacter pylori* | Causes cell DNA damage by producing ROMs |

According to reports, many types of tumors have been reported to contain intratumoral bacteria. However, recent studies have shown that the disease status of cancer patients with systemic bacterial infections can also be affected, which suggests that extratumoral bacteria (EB) may impact tumor progression. Due to the intervention of antibiotics in the course of cancer treatment, the common bacterial pathogens in cancer patients have gradually changed from Gram-positive bacteria to Gram-negative bacteria in recent decades, and they are more resistant to antibiotics. Therefore, due to neutropenia, congenital diseases, or acquired immune system abnormalities caused by bacteremia, bacterial infections in cancer patients have become one of the serious complications during chemotherapy. According to reports, most cancer patients with sepsis are infected with Gram-negative bacteria. From 2007 to 2014, the average recovery rate of bacteremia in this patient cohort was only 51.3% (24.7%-75.8%). As such, drug resistance caused by secondary infection has also become an urgent problem during cancer treatment.

Due to the complexity and dynamics of the tumor microenvironment, both cancer-promoting and anti-cancer effects have been reported in the presence of bacterial-mediated inflammation. Cancer promoting effects can be mediated by promoting the induction, invasion, and metastasis of cancer. Clinical studies have shown that in addition to directly invading cells, bacteria can also form biofilms that cover or infiltrate the interstitial tumor spaces of patients with colorectal cancer (CRC). The colonization of bacterial biofilms in tumor tissues is also correlated with the upregulation of pro-inflammatory cytokines (such as IL-6) in samples from CRC patients. Animal studies have also shown that transplanting biofilms from cancer patients, and even healthy individuals can induce tumor formation. In addition, the biofilm that infiltrated the tumor can protect tumor cells and enhance tumor cell resistance to anticancer drugs. In addition, most biofilm models, such as flow cell and Peglid assays are 2D, and cannot reflect the actual complex 3D structures found in vivo. Although many such clinical studies have shown a correlation between the presence of bacterial infections and tumor progression, a well-defined model is pivotal to reveal the detailed interactions between these two components, providing adequate response measures for cancer patients with systemic bacterial infections, and reveal how the distribution of bacteria in tumor tissues can affect cancer cell phenotypes and tumor progression. Furthermore, most cancer patients are usually highly susceptible to bacterial infections after chemotherapy, and inappropriate antibiotic treatment can worsen their prognosis and survival rates.

Here, a microfluidic platform was developed to analyze the effects of IB and EB on bladder tumor progression under defined conditions. It was found that the tumor response will vary in the presence of EB and IB, with tumor clusters becoming more compact over time in the presence of EB only. Exposure of tumor cells to IB led to decreased cell viability, but not in the presence of EB. The different effects of IB and EB on tumor progression result from biofilm formation only in the presence of EB. Our PIEB model supports prior clinical studies that suggested a protective role of biofilms in patients with colorectal tumors. In addition, it was demonstrated that the proportion of cancer stem cell-like phenotype increased significantly in the model with EB, confirming that eradicating infections in cancer patients is essential for a better prognosis. The addition of DNase reversed the effects induced by the formation of biofilms. It is envisaged that the results of these studies will promote a better understanding of the impact of bacteria on tumor progression and that the PIEB model can facilitate further research on the role of antibacterial agents in cancer management.

Materials and Methods

Fabrication of Microfluidic Device

The master mold of the tapered microwell layer and the gradient generator for the culture media inlet was made through diffuser back-side lithography procedures. The mold was hard-baked at 150° C. for five minutes for PDMS molding. A replica PDMS mold was made via double-casting as the working mold for further manufacturing processing to protect the micropatterns on a silicon wafer. PDMS was prepared using the Sylgard 184 Silicone Elastomer Kit (Dow Corning) via a thorough mixing of the base resin and curing agent in a weight ratio of 10:1. After demolding from the master mold, the first PDMS replica is the mold with recessed patterns. After plasma treatment for 2 minutes using plasma cleaner (high RF level, 700 mmtor), this replica was immediately exposed to vapors of trichloro (1H,1H,2H,2H-perfluorooctyl) silane (Sigma-Aldrich, cat no 448931) in a vacuum desiccator for at least 6 h. The second PDMS mold was fabricated by the same procedure. For the fabrication of the barrier layer, which defined the 32 microchannel regions and the gradient generator with a wider channel for bacteria inlet, polylactic acid (PLA) molds by 3D printing were used. Three layers (bottom: microwell layer, middle: microchannel layer, top: gradient generator layers) were assembled by plasma-treated for 5 minutes (high RF level, 700 mmtor) and baking for 2 h at 70° C.

Cell Culture

The human bladder carcinoma cell line UMUC-3 (CRL-1749™, America Type Culture Collection) were maintained in modified Eagle's medium alpha (MEM a; Gibco) supplemented with 10% (v/v) fetal bovine serum (FBS; Gibco) and 1% (v/v) penicillin-streptomycin (Gibco) at 37° C. with 5% $CO_2$ in a humidified environment. Cells were cultured in sterile T25 or T75 flasks (BD Bioscience) with growth media replaced every 48 h, and subcultivation once confluence reaches 80%.

Cell Seeding

Before cell seeding, 70% (v/v) ethanol (EtOH; UNI-CHEM) was added into channels and placed for at least 2 h to remove air bubbles in the microwells. After washing away EtOH with 1×PBS (Gibco), the microwell layer was coated with 2.5% (v/v) BSA (Sigma-Aldrich, cat no A9418-5G) by adding 50 µL each layer overnight and stored under 4° C. UMUC-3 cell line was passaged and diluted according to several microwell channels and desired cluster size. Each channel was added with 150 µL cell suspension after removing BSA, and then the device was incubated at 37° C. with 5% $CO_2$ for 24 h.

Optimizing Seeding Concentration

After passage and cell count using a hemocytometer, UMUC-3 cell line suspension was diluted to a concentration of $4\times10^5$/mL. UMUC-3 cells were seeded into four microchannels, with a range of dilution ($1.7\times10^4$, $2.1\times10^4$, $3.5\times10^4$, $6.0\times10^4$ cells per channel). After incubating at 37° C. for 24 h, in situ analysis of size and density of formed clusters and cell viability were done via optical and fluorescence microscopy, which are the key parameters that determine the optimal seeding concentration.

Culturing Bacterial Strain

A uropathogenic *E. coli* strain UTI89 (UTGFP1× pBRdsRED) transformed with the plasmid that expresses the DsRed fluorescent protein was provided by Dr. SL Chua from the Hong Kong Polytechnic University. A small amount of cryogenic bacterial liquid was transferred into 2 mL Luria-Bertani (LB; Sigma-Aldrich, Cat no. L3522-250G) broth using a 10 µL pipette with a pipette tip. The lysogeny broth (LB) tube was then incubated at 37° C. to allow bacterial growth for 24 h when the CFU of bacterial broth reached around $10^9$.

Establishment of CT and CL Models

For CT models, bacterial suspension was centrifuged for 10,000 rpm for 5 min, and the supernatant was removed and replaced with MEM-α (10% supplemented with FBS, no added penicillin-streptomycin) at final dilutions at the rate of 500:1, 100:1, and 1:1 (bacteria:cell). After seeding and incubating for 24 h, the UMUC-3 cell clusters in the microchannels were stained using Hoechst dye for 30 minutes at 37° C. before infection. After original media with dye in channels was gently removed, the diluted bacterial suspension was added into 9 channels separately, three channels per concentration. The corresponding control group of the two models was obtained at time points before the introduction of bacteria.

As for CL models, bacteria suspended in MEM a and UMUC-3 cells (no added penicillin-streptomycin) were mixed before seeding at the rate of 500:1, 100:1, and 1:1. The device was incubated at 37° C. with 5% $CO_2$ and in situ imaging and analyzing at 1 h, 9 h, and 24 h, respectively. Besides, an isolated channel only with 24 h cultured UMUC-3 was set as a negative control to indicate the beginning of the infection.

CFU Analysis for Viable Bacterial Cell Count

After infection, the channels were washed with 1×PBS three times to remove residual gentamicin and added ddH2O to break up the biofilm structure and lyse the cells to release invaded bacteria. The washed bacterial suspension was collected and diluted with 1-$10^4$ dilution. Then 5 uL suspension in each dilution was spotted on the LB agar plate. Each dilution was set up with five parallel controls. The LB agar plate was incubated at 37° C. for 24 h until 30~300 strains were grown in each droplet and enumerated. The CFU/ml is tabulated by the average number of colonies×dilution factor×200.

Culture Morphology In Situ Analysis

The clusters formed in the microwell after 24 h culture or infection were imaged via an optical microscope by the device put on the objective directly at 40× or 100× magnification. Each channel was shot at three frames at the top, middle and bottom state. The image processing and analysis of cluster size and density were done through ImageJ software.

Cell Viability In Situ Analysis

For fluorescent staining analysis, the nuclear dye Hoechst (Life Technologies) and Calcein-AM (Invitrogen) were added into cell suspension in the channel at dilution of 1:1000 (v/v). After incubating for 30 minutes at 37° C. for staining, the media was gently removed from each channel, and the device could be imaged via Nikon Ci-L fluorescent microscope directly at 10× magnification. The images processing and cell counting under fluorescent staining were done through ImageJ software. For infection analysis imaging, after incubating for 30 minutes with fluorescent dyes and remove the mixture of dyes and media in the channel, the channels were washed with 1×PBS to remove unbound bacteria and treated with 100 μg/mL gentamicin for 2 h to kill the extracellular bacteria, then the device could be imaged directly.

In Situ Immunostaining Assay

The infected cell clusters were firstly washed with 1×PBS gently and treated with 100 μg/mL gentamicin for 2 h to kill extracellular bacteria but keep the intracellular ones. Then channels were loaded PBS with antibody dyes at dilution of 500:1 (v/v). After incubating for 30 minutes at room temperature for staining, the PBS was gently removed from each channel, and the stained clusters could be directly observed through a fluorescent microscope.

Crystal Violet Staining of Biofilms

After infection, the channels with seeded clusters were washed with 1×PBS three times, and 0.1% crystal violet dye (Sigma-Aldrich) were added into channels to stain the biofilm for 1 min, then washed with 1×PBS three times to remove unstained crystal violet dye. The device was imaged via an optical microscope to observe the stained biofilm structure. Spectrometer analysis was also carried out by washing biofilms stained with CV by 70% ethanol to a 96-well plate (SPL Life Sciences) and detecting the absorbance at a wavelength of 595 nm.

DNase Treatment of Coculture

To dissolve the biofilm, 1×DNase (0.01 mg/mL; Sigma-Aldrich) diluted with fresh antibiotic-free culture media were added into channels after 1 h infection, and the device was continually incubated at 37° C. for 8 h. Then downstream in situ analysis was done after removing DNase and washing channels with PBS. The untreated clusters after 9 h infection were set as control.

Drug Treatments of Biofilms and Cancer Cell Clusters

For triple-drug combinatorial treatments, 150 μl of fresh LB culture was added with 0.0125 μg/ml ciprofloxacin, 1×DNase to each well. After 8 h incubation, biofilms were disrupted by repeated pipetting, vortexing, and sonication in an ice-cold water bath (10 minutes) before serially diluted for plating on LB agar plates. The plates were incubated at 37° C. for bacterial colony growth and subsequent enumeration of colonies. CFU $mL^{-1}$ was tabulated as average colony number×dilution factor×volume. The dose-response curves of doxorubicin for cancer cells from the CT and CL models were fitted and drawn using the Origin 9 software with five-parameter equations to calculate the half-maximal inhibitory concentration (IC50) values. The IC50 value was defined as the drug concentration value that resulted in 50% viability of cells and determined by the concentration value (x-axis) corresponding to the value at 50% cell viability (y-axis), as indicated on the dosage-response curve.

Statistical Analysis

The results were expressed as means±standard deviation. Data groups were compared using the one-way ANOVA and Student's t-test to evaluate associations between independent variables, and the P values were obtained.

Example 1

Figure 2:
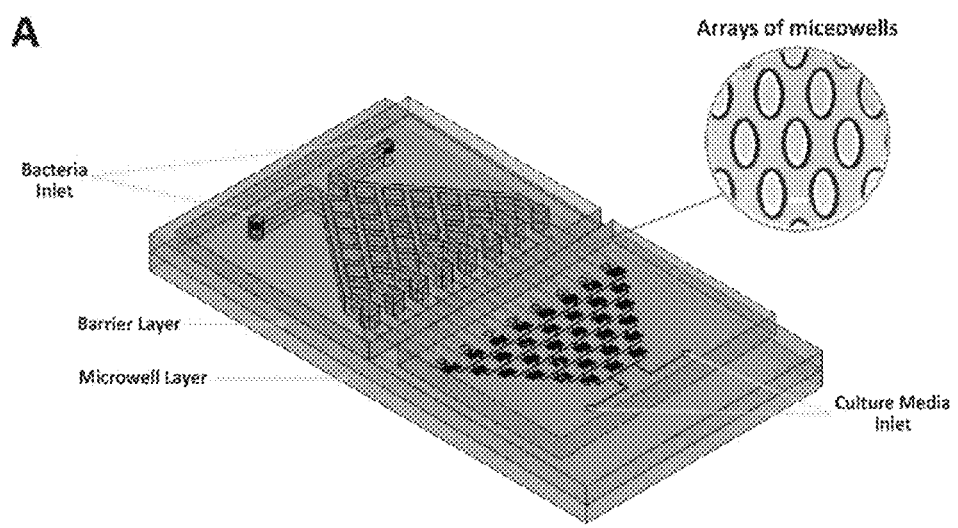
FIG. 2 Development of a microfluidic platform to analyze the role of inflammation in cancer microbiome interactions. (A) Schematic diagram of the microfluidic device. The microfluidic device includes three layers, with four inlets on the top for bacteria and culture; the middle barrier layer forms the channels. The bottom layer contains an array of tapered microwells utilized for the formation of cell clusters. Scale bar, 100 μm. (B) Representative image of the device.
Figure 2:
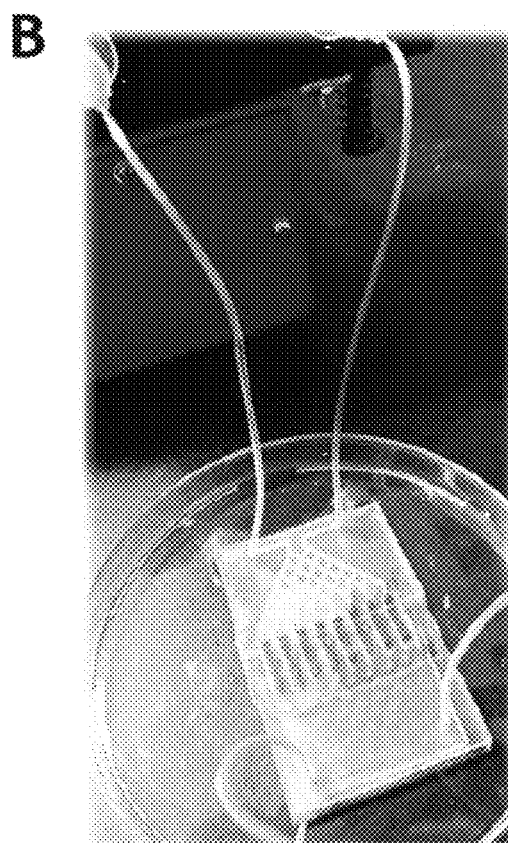
Figure 2:
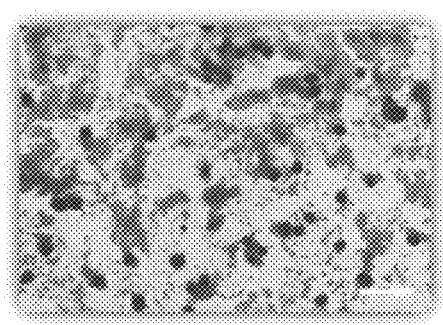
Figure 2:
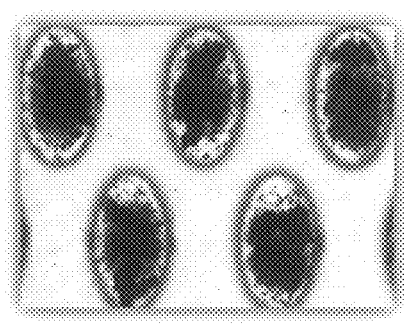
Figure 2:
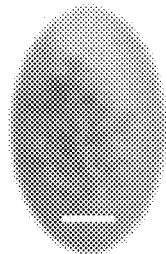
Figure 2:
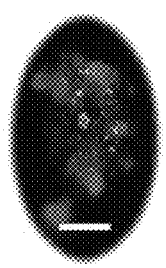

Development of the Microfluidic Platform to Analyze the Roles of Intratumoral and Extratumoral Bacteria (PIEB) in Cancer Microbiome Interactions In order to study the effects of intratumoral bacteria (IB) and extratumoral bacteria (EB) on the progression of bladder tumors under defined conditions, an integrated microfluidic PIEB platform was developed, which consisted of four components: (i) a bottom layer for bacteria distribution, (ii) a middle microwell layer for tumor-bacteria co-culture cluster formation, (iii) a top layer to generate drug gradients and an (iv) upper barrier layer to retain fluids (FIG. 2A-B). UMUC-3 bladder cancer cells and uropathogenic *Escherichia coli* (UPEC) UTI89 were used as a proof-of-concept in this study, respectively, reflecting the composition of cancer and bacteria in a well-defined environment. The cells were uniformly suspended in the growth media and seeded into each microchannel at the optimal seeding concentration. 3D bacteria biofilms relevant to in vivo infections were established in the device (FIG. 2C). Under optimal culture conditions, the cells will form uniform clusters in the center of each microwell after 24 h and can be processed for downstream analysis (FIG. 2D).

The microfluidic PIEB platform was formed with three polydimethylsiloxane (PDMS) layers. Each layer was obtained from a master mold produced by 3D printing or standard photolithography, and the PDMS layers were permanently bonded by oxygen plasma surface activation for assembly. The performance stability of the gradient generator could be determined by the visualization of food dyes. As mentioned in previous studies, the small change between the actual concentration and the expected value was not significant. The input flow rates of the top gradient generator and the bottom bacterial distributor were both set to 100 μL/min.

Example 2

Optimization of Co-Culture Parameters in the PIEB Model

The device was designed to fit a 100-mm petri dish, which was then filled with sterile deionized water and kept in a humidified chamber to minimize the evaporation effects of long-term culture. Various cancer cell seeding concentrations (corresponding to 17-60 cells per microwell) were screened to evaluate the optimal cluster size to establish compact and viable cancer clusters effectively.

The seeding concentration of $2.1 \times 10^4$ cells per channel (21 cells per microwell) showed that the proportion of viable cells was the highest after 24 h, as reflected by the Calcein-AM dye labeling, reflecting the presence of viable cells. However, seeding concentrations of $3.5 \times 10^4$ cells per channel (35 cells per microwell) could produce clusters in a size range of $8112.46 \pm 921.99$ μm$^2$, which was clinically comparable to large cancer microclusters (~50 cells). Since the cell viability of clusters seeded at a concentration of $3.5 \times 10^4$ cells per channel ($77.07 \pm 14.73\%$) was not significantly reduced compared to cultures seeded at a concentration of $2.1 \times 10^4$ cells per channel ($77.49 \pm 14.62\%$) (FIG. 3), therefore subsequent analyses were performed with $3.5 \times 10^4$ cells per channel.

Example 3

The Distribution of Bacteria in the Tumor Microenvironment Affects the Morphology and Viability of the Tumor In order to evaluate the pathological effects of bacterial distribution in the tumor microenvironment on the growth of bladder cancer clusters and their phenotypes, two infection models were proposed, namely the colonizing model (CL) and the coating model (CT), to reflect the response of cancer cells under the presence of IB and EB, respectively (FIG. 4A). Specifically, in the CL model, bacteria infiltrate the cancer cell cluster, while in the CT model, most of the bacteria remain on the surface of the cancer cell cluster.

After the infection was established, the co-cultures were allowed to interact and then analyzed at various time points (1 h, 9 h, and 24 h). These time points were selected based on previous studies on the co-culture of UTI89 and SW480, albeit these studies focused on the pathogenic effect of bacteria on mouse infection models.

Here, the morphological parameters of cancer clusters were evaluated, namely cluster size, and density. The cluster boundary was obtained through the analysis of gray values for phase-contrast images (FIG. 5). Through fluorescence observation, under a low multiplicity of infection (MOI) (bacteria:cancer cells=1:1 and 100:1), it was found that under the short-term infection period (1-9 h), the cancer clusters of CT and CL models became denser, as observed by fluorescence imaging under Calcein-AM and Hoechst staining (FIG. 4B-C). The low MOI ranges were selected to reflect physiologically relevant concentrations in vivo. Compared with all MOIs, the cluster size in the CT model decreased with a 0.47 fold-change from 1 h to 9 h most significantly (MOI 1:1; $6695.06 \pm 1328.58$ μm$^2$ to $3145.99 \pm 1239.52$ μm$^2$) (FIG. 4B), as compared to a 0.91 fold-change in the CL model ($8178.95 \pm 2963.23$ μm$^2$ to $7418.05 \pm 2329.95$ μm$^2$) (FIG. 4C). In the two models with higher MOI (500:1) after 24 h, the decrease in cluster size became the most significant, with similar 0.75 fold-change (CT: $7418.05 \pm 2329.95$ μm$^2$ to $5592.97 \pm 1822.30$ μm$^2$) (CL: $7418.05 \pm 2329.95$ μm$^2$ to $5592.97 \pm 1822.30$ μm$^2$). Despite the overall observed cluster reduction, at the early infection time point (1 h), the size of clusters in the CL model increased slightly, while the MOI was lower (1:1 and 100:1), which could be due to the exponential growth of the infiltrating IB within the cluster, which masked the impact of bacteria on inducing denser cluster size.

In order to evaluate the influence of the distribution of bacteria in the tumor microenvironment on the viability of cancer cells, the co-cultured clusters were labeled with Calcein-AM to reflect the proportion of viable cells (Calcein-AM+) (FIG. 6A-B). The results showed that when only bacteria were located outside the cluster (CT model), the presence of bacteria would not induce cancer cell killing effects. Specifically, even after 24 h under all MOI infections, the proportion of cluster cell viability in the CT model remained above 80% (CT model:MOI 1:1-$88.56 \pm 4.61\%$, MOI 100:1-$80.16 \pm 18.94\%$, MOI 500:1-$88.89 \pm 3.23$) (CL: MOI 1:1-$72.65 \pm 5.17\%$, MOI 100:1-$61.81 \pm 8.86\%$, MOI 500:1-$71.45 \pm 5.86\%$ (FIG. 6C). In the presence of IB under MOI 1:1 with the CL model, the viability of cancer cells would be greatly reduced even after only 9 h. Even in the 1 h infection period with a higher MOI (500:1), the anti-cancer effect became apparent (FIG. 6D). These observations are consistent with recent reports on the use of colonizing bacteria for cancer treatment, and may indicate that the selection of bacteria for similar anti-cancer applications should be limited to bacteria with chemoreceptors located in tumors. As the infection time prolonged (48 h-72 h), cell lysis was observed in the CL model, resulting in a sharp decrease in cancer cell clusters and decreased cell viability. Nevertheless, no significant cluster size and cell viability changes were observed in the CT model after prolonged infection, although a slight decrease in cell viability was observed (FIG. 7).

Example 4

The Effect on Tumor Progression and Viability is Attributed to the Presence of Biofilm in the CT Model Previous clinical studies have shown the protective effect of biofilms on colorectal tumors. Crystal violet staining was first performed to detect the presence of biofilm in the two infection models. Crystal violet staining and quantitative analysis of colony-forming units (CFU) are commonly used techniques to assess the presence of biofilms.

Crystal violet staining showed that biofilms only exist in the CT model. Due to the limitations of visualization, the differential location of staining was more obvious at low MOI (1:1) (FIG. 8A-B). The CV staining was further quantified via spectrometer analysis by washing out biofilms stained with CV and detecting the OD595 absorbance values. While crystal violet staining has been used to stain biofilms in vitro microplate assay, it is the first time the CV staining assay is adopted for biofilm-tumor interactions. It was demonstrated that the OD595 values from the CT model were not higher than the OD595 values from the CL model, which was most significant in higher MOI (500:1) after infection at 24 h (FIG. 8C). The presence of biofilm in the CT model was supported by the colony-forming unit (CFU) count of the bacterial numbers in lower MOI samples (1:1 and 100:1), and the CFU count was obtained after removing the non-adherent bacteria (FIG. 8D, FIG. 9). Specifically, the difference in CFU of adherent bacteria between CT and CL models, which reflected biofilm cell counts, were most significant at 9 h of infection (MOI 1:1; CT: $3.2 \times 10^6$ per mL, CL: $1.42 \times 10^5$ per mL), which indicated that biofilms only exist in the CT model.

Example 5

Tumor Metastatic Potential is Affected by the Distribution of Bacteria in the Tumor Microenvironment The differential localization of bacteria in CT and CL models affected the expression of CD44 and CD24 biomarkers, both of which reflected the cancer stem cell (CSC) phenotype (FIG. 10A, FIG. 11). This was most obvious in the expression of CD44, which was significantly increased in cancer cells in CT models under all MOI. Overall, compared to CL models ($51.23 \pm 5.81\%$), the proportion of CD44+ cells in CT models was significantly increased, especially at MOI 1:1 after 9 h infection period (62.78±14.23%) (FIG. 10B). Specifically, 9 h after infection, the ratio of CD44+/CD24+ cells in the CT model was also 1.89 folds higher than that in the CL model, especially at low MOI (CT: 40.55±12.7%; CL: 21.42±9.89%) (FIG. 10C-E). At higher MOIs of 100:1 (CT: 33.34±5.49%; CL: 32.87±2.90%) and 500:1 (CT: 32.41±7.98%; CL: 25.54±8.01%), the increased proportion of CSCs became less apparent.

Under a prolonged infection period (24 h), the proportion of CSCs in the cancer cluster within the CT model was similarly increased and was most apparent by 1.86 folds in co-cultures under low MOI (1:1) (CT: 43.29±11.50%; CL: 23.26±7.77%). This observation under low MOI could be due to the presence of low degrees of infection, which allowed the cells to remain viable compared to higher MOIs. The increase in proportion of CSCs under MOI 100:1 (CT: 31.13±1.15%; CL: 30.07±11.99%) and 500:1 (CT: 43.09±9.71%; CL: 32.06±9.60%) were less apparent. The difference in CD44 expression was more evident when the fluorescence intensity of CD44 was quantified, and the intensities of CD44 expression in cancer cells of the CT model were significantly higher than those from the CL model under all MOIs (1-9 h; FIG. 10F). The proportion of CSCs-like cells in clusters without infection is 28.93±7.73%. These findings reflect the urgent need for relevant infection models to study the impact of EB on the tumor progression of cancer patients when they are infected with systemic infection during treatment.

Example 6

Cancer Treatment Requires a Combination with Biofilm Disrupting Agents to Improve Treatment Efficiency In order to further verify that the presence of biofilm is critical to affecting tumor progression, the clusters were treated with DNase to disrupt the biofilm matrix, and then the size and viability of the clusters were quantitatively evaluated. Extracellular DNA (eDNA) is a major component in UPEC biofilms, so DNase was used to treat bacterial infections mediated by biofilms.

Treatment with 0.01 mg/mL DNase could reverse the effect of cluster size reduction after 9 h of infection in the CT model (FIG. 12A). A slight increase in cluster size was also observed in the CL model, but the increase in cluster size was comparable to that of uninfected clusters. This could be due to the parallel digestion of DNA from lysed cancer cells, leading to more dispersed clusters. Similar DNA traps have also been reported to promote inflammation and tumor metastasis. With biofilm disruption by DNase in the CT model, cancer cell viability had similarly increased to a level comparable to that in the CL model, and the effect was more obvious at higher MOIs (100:1 and 500:1) (FIG. 12B). Compared with the untreated control, the expression intensity of CD44 and CD24 in the DNase-treated samples with the CT model was also reduced, although this effect was improved at a higher MOI due to the higher percentage of biofilm (FIG. 12C-D, FIG. 13). Interestingly, subpopulations of cancer cells with different fluorescent intensities of CD44 and CD24 could be observed after treatment, reflecting the heterogeneity in tumors. It is important to note that in clinical applications, the treatment strategy of biofilm-disrupting agents should be used to supplement antibacterial agents to reduce the overall bacterial level in circulation.

Example 7

Combinatorial Treatment with the Anti-Cancer Drug and Antibacterial Agents Simultaneously Eradicated Biofilms and Cancer Cells within the CT Model A triple therapy of DNase-ciprofloxacin(Cipro)-doxorubicin(DOX) was proposed to simultaneously eradicate resident biofilms and cancer clusters (FIG. 14). As a control, It was first confirmed that neither ciprofloxacin nor DNase had adverse effect on non-infected cancer cells (FIG. 14B-C). Then, the IC50 value of doxorubicin on cancer cells with the CT and CL models (FIG. 14D) was determined. It was observed that the IC50 of doxorubicin on cancer cells with the CT model was significantly higher than cancer cells with the CL model (CT: 1.79 µM, CL: 1.59 µM). The higher IC50 values indicated that the presence of biofilms produced in the presence of EB induced higher drug resistance. At MOI 1:1, the viability of cancer cells under the triple therapy of DNase (1×)-Cipro (MIC: 0.025 µg/mL)-doxorubicin (IC50: 1.79 µM in CT model, 1.59 µM in CL model) was reduced after 72 h, as compared to monotherapy groups (FIG. 14E). This implied that by removing biofilms, the drug resistance of cancer cells induced by inflammatory conditions such as systemic infection could be completely eradicated. Furthermore, the biofilms formed only under DOX treatment and triple-drug treatment for 72 h were tested by quantifying crystal-violet-staining. A microplate reader was used to test the OD595 values of solubilized CV from CT and CL models under MOI 1:1 (FIG. 14F). The results demonstrated that in the two models, the degree of biofilm elimination under the triple-drug treatment was better than that of doxorubicin alone. This observation was more apparent in the CT models (CT models: DOX-only treatment, 2.029±1.073, triple-drug treatment, 1.551±0.137; CL models, DOX-only treatment, 2.027±0.220, triple-drug treatment, 1.644±0.097). This further confirmed that the triple-drug strategy could reduce drug resistance of cancer cells by destroying the biofilm.

In vitro drug assays have identified new drug combinations, some of which have been further validated by in vivo models. Due to the complexity and dynamics of the tumor microenvironment and other underlying issues such as inflammatory disease, it is not feasible to combine drug therapies without the development of relevant in vitro assays that can reveal potential benefits or toxicity rapidly and cost-effectively.

A proof of concept microfluidic approach was presented to effectively study the interactions between bacteria and cancer microclusters under clearly defined conditions, thereby providing insights into the treatment strategies of cancer patients receiving systemic bacterial infections. The co-culture model can be rapidly established within 24 h under optimal growth conditions, reducing waiting times for growing cultures. This study suggests that the different spatial distribution of bacteria in the tumor microenvironment affects tumor progression and growth. These outcomes emphasize the importance of choosing the right treatment strategy to eliminate bacteremia in cancer patients.

The PIEB microfluidic device based on microwells provides a reliable design to obtain comparative results from samples obtained under different processing conditions. The molds for each layer were produced using different strategies to suit the respective geometric shapes, dimensions, and tolerances of the respective features. The integrated device showed robust performance through even distribution of cell and bacteria components. Due to the integration of microfluidics, only a small number of samples are needed to establish microclusters, which opens up possibilities for applications related to rare primary cancer cells. The deviation of the shear rate and the perfusion rate is negligible. The operation of the device is straightforward, and fabrication is cost-effective. This opens up potential utility for patient clinical samples (such as the patients' tumor microbiome and circulating tumor cell culture), which has previously been reported to reflect the patient's prognosis. The development of this assay will facilitate rapid, high-throughput, and inexpensive assessments of drug response to guide the development of drug discovery and treatment options for personalized treatments.

Future studies may aim to realize the possibility of real-time assessment of infection status through co-culture assays by performing a liquid biopsy of cancer patients before antibiotics are given to determine the best treatment strategy. This co-culture model can also be used to analyze the mechanism of complex interactions between bacteria and cancer cells during acute infections. Appropriate treatment strategies can prevent cancer patients from prolonging antibiotic treatment, improving their prognosis and survival rate.

EQUIVALENTS

The foregoing examples are presented for the purpose of illustrating the invention and should not be construed as imposing any limitation on the scope of the invention. It will readily be apparent that numerous modifications and alterations may be made to the specific embodiments of the invention described above and illustrated in the examples without departing from the principles underlying the invention. All such modifications and alterations are intended to be embraced by this application.

The invention claimed is:

1. A method for establishing a cell model for a disease, comprising:
   (a) providing a microfluidic device comprising:
      a housing having at least three layers;
      a first inlet area at a top layer and at one end of the housing for receiving a first mixture comprising cells;
      a second inlet area at the top layer and at an opposite end of the housing for receiving a second mixture comprising one or more agents or one or more pathogens; and
      a plurality of microchannels through which one or both of the first mixture and the second mixture flows into corresponding wells, wherein each microchannel has an end in fluid communication with the first inlet area, and another end in fluid communication with the second inlet area;
   (b) adding the cells to the microfluidic device;
   (c) culturing said cells in the microfluidic device to establish the cell model;
   (d) adding the one or more pathogens to the microfluidic device after the addition of the cells;
   (e) culturing the one or more pathogens with said cells; and
   (f) analyzing one or more effects of the one or more pathogens on said cells, one or more interactions between the one or more pathogens and said cells, or both,
   or
   (i) providing a microfluidic device comprising:
      a housing having at least three layers;
      a first inlet area at a top layer and at one end of the housing for receiving a first mixture comprising cells;
      a second inlet area at the top layer and at an opposite end of the housing for receiving a second mixture comprising one or more agents or one or more pathogens; and
      a plurality of microchannels through which one or both of the first mixture and the second mixture flows into corresponding wells, wherein each microchannel has an end in fluid communication with the first inlet area, and another end in fluid communication with the second inlet area;
   (ii) adding the cells and the one or more pathogens to the microfluidic device concurrently;
   (iii) culturing the one or more pathogens with said cells; and
   (iv) analyzing one or more effects of the one or more pathogens on said cells, one or more interactions between the one or more pathogens and said cells, or both.

2. The method of claim 1, wherein the cells form a cell cluster in step (c) prior to the addition of the one or more pathogens of step (d).

3. The method of claim 1, wherein the cells and the one or more pathogens form a cluster comprising cells and pathogen in step (iii).

4. The method of claim 1, wherein the disease is cancer, or a disease associated with cancer, or both, and wherein the cells are cancer cells or cancer-associated cells.

5. The method of claim 4, wherein the cancer cells are selected from the group consisting of colon, bladder, breast, prostate, ovarian, cervical, squamous, lung, pancreatic, stomach, kidney, and liver cancer cells.

6. The method of claim 1, wherein the one or more pathogens are selected from the group consisting of a bacterium, a virus, a fungus, and other microorganisms.

7. A method for identifying one or more agents or one or more pathogens for treatment of a disease, comprising:
   (a) providing a microfluidic device comprising:
      a housing having at least three layers;
      a first inlet area at a top layer and at one end of the housing for receiving a first mixture comprising cells;
      a second inlet area at the top layer and at an opposite end of the housing for receiving a second mixture comprising one or more agents or one or more pathogens; and
      a plurality of microchannels through which one or both of the first mixture and the second mixture flows into corresponding wells, wherein each microchannel has an end in fluid communication with the first inlet area, and another end in fluid communication with the second inlet area;
   (b) adding the cells, or the cells and a first pathogen to the microfluidic device;
   (c) culturing said cells, or said cells and the first pathogen in the microfluidic device to establish a cell model;
   (d) adding the one or more agents or the one or more pathogens to the cell model;
   (e) monitoring one or more characteristics of said cells, the one or more pathogens, or both and comparing the one or more characteristics with a reference; and
   (f) identifying the one or more agents or the one or more pathogens for treatment of the disease based on a change in the one or more characteristics relative to the reference.

8. The method of claim 7, wherein the one or more agents or the one or more pathogens are selected from the group consisting of one or more antimicrobial agents, one or more antibiotics, one or more biofilm dispersal agents, one or more anti-cancer drugs, one or more bacteria, one or more viruses, one or more funguses, one or more other microorganisms, one or more small molecules, and combinations thereof.

9. The method of claim 7, wherein the disease is cancer, or a disease associated with cancer, or both, and wherein the cells are cancer cells or cancer-associated cells.

10. A method for treating a disease in a subject in need thereof, comprising administering the one or more agents or the one or more pathogens identified according to the method of claim 7 to the subject.

11. A method for predicting a response to a combinational therapy in a subject in need thereof, comprising:
(a) providing a microfluidic device comprising:
    a housing having at least three layers;
    a first inlet area at a top layer and at one end of the housing for receiving a first mixture comprising cells;
    a second inlet area at the top layer and at an opposite end of the housing for receiving a second mixture comprising one or more agents or one or more pathogens; and
    a plurality of microchannels through which one or both of the first mixture and the second mixture flows into corresponding wells, wherein each microchannel has an end in fluid communication with the first inlet area, and another end in fluid communication with the second inlet area;
(b) adding a sample obtained from the subject to the microfluidic device, wherein the sample comprises cells, or cells and a pathogen;
(c) culturing said cells, or said cells and pathogen in the microfluidic device to establish a cell model;
(d) detecting the presence of bacterial biofilm;
(e) adding a combinational therapy to the cell model;
(f) monitoring one or more characteristics of said cells, pathogen, or both and comparing the one or more characteristics with a reference; and
(g) predicting the response based on a change in the one or more characteristics relative to the reference.

* * * * *